US006633511B1

(12) United States Patent
Moteki et al.

(10) Patent No.: US 6,633,511 B1
(45) Date of Patent: Oct. 14, 2003

(54) ELECTRONIC CONTROLLING TYPE MECHANICAL TIMEPIECE

(75) Inventors: Masatoshi Moteki, Shiojiri; Hirokazu Sekino, Chino; Kinya Matsuzawa, Shiojiri, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/600,288

(22) PCT Filed: Nov. 17, 1999

(86) PCT No.: PCT/JP99/06425

§ 371 (c)(1),
(2), (4) Date: Oct. 3, 2000

(87) PCT Pub. No.: WO00/29910

PCT Pub. Date: May 25, 2000

(30) Foreign Application Priority Data

Nov. 17, 1998 (JP) ........................................ 10-326823P
Jan. 22, 1999 (JP) ........................................ 11-014690P

(51) Int. Cl.$^{7}$ ............................ G04B 1/00; G04C 3/00; H02P 9/40

(52) U.S. Cl. ............................ 368/204; 322/49; 322/52

(58) Field of Search ................................ 368/155–157, 368/160, 203–204; 310/40 R, 46–49; 322/44, 49, 50, 51, 52

(56) References Cited

U.S. PATENT DOCUMENTS 5,517,469 A 5/1996 Wiget
5,615,178 A 3/1997 Takakura et al.
5,668,414 A 9/1997 Takahashi et al.
6,097,675 A 8/2000 Takahashi et al.
6,194,862 B1 * 2/2001 Hara

FOREIGN PATENT DOCUMENTS

| | | |
|---|---|---|
| EP | 0 816 955 | 1/1998 |
| JP | 8-5758 | 1/1996 |
| JP | 8-50186 | 2/1996 |
| JP | 8-75874 | 3/1996 |
| JP | 8-101284 | 4/1996 |
| JP | 09-203785 | 8/1997 |
| JP | 10-42532 | 2/1998 |
| JP | 11-23743 | 1/1999 |
| JP | 11-101880 | 4/1999 |
| JP | 11-160463 | 6/1999 |

* cited by examiner

*Primary Examiner*—Vit Miska
(74) *Attorney, Agent, or Firm*—Michael T. Gabrik

(57) ABSTRACT

An inside notch (37) serving as an adjusting section is provided for a magnetic balancing adjustment between stators (31 and 32) and a rotor (12). The inside notch acts to reduce cogging torque, thereby allowing the rotor to rotate using a slight torque. Therefore, the rotor can be more readily started without using a complicated structure, can be prevented from easily stopping due to an external disturbance, and can be made more reliable. In reducing the cogging torque, it is not necessary to reduce the number of magnetic flux lines by, for example, making a rotor magnet (12*b*) smaller, making it possible to maintain the efficiency with which electrical power is produced.

21 Claims, 25 Drawing Sheets

ELECTRONIC CONTROLLING TYPE MECHANICAL TIMEPIECE

TECHNICAL FIELD

The present invention relates to an electronic controlling type mechanical timepiece in which the period of rotation of a generator is controlled by operating, a rotation controlling device by electrical power output from the generator operated by mechanical energy, used as a driving source, of a mechanical energy accumulating device, such as a mainspring.

BACKGROUND ART

There is known an electronic controlling type mechanical timepiece which controls the driving of a hand by controlling the period of rotation of a generator operated by a controlling device, such as an IC, by electrical power produced by rotation of the generator to which energy has been transmitted from a mechanical energy accumulating device, such as a mainspring, serving as an energy source.

According to the principle of driving the electronic controlling type mechanical timepiece, the mechanical energy accumulating device, such as a mainspring, is used as a mechanical energy source to drive a wheel train, and, instead of using a mechanical speed regulating mechanism, comprising an escape wheel and a timed annular balance that are characteristic component parts of a mechanical timepiece, a generator which is connected to the wheel train is used. The generator generates electrical power as a result of being subjected to rotational motion of the wheel train, and the electrical power generated thereby drives a controlling electronic circuit which is driven to generate a control signal. The period of rotation of the generator is controlled by the control signal from the electronic circuit in order to brake the wheel train and regulate the speed thereof. Therefore, in this structure, it is not necessary to use a battery for the driving source of the electronic circuit, and a precision as high as that provided by a battery-driven type electronic timepiece is provided.

A conventional electronic controlling type mechanical timepiece technology is disclosed, for example, in Japanese Unexamined Patent Application Publication No. 8-5758 previously developed by the applicant. FIG. 28 is a plan view of the timepiece disclosed in the document, and FIG. 29 is a partial perspective view of a generator used in the timepiece.

The electronic controlling mechanical timepiece comprises a movement barrel including a mainspring, a barrel gear, a barrel arbor, and a barrel cover. The mainspring is a mechanical energy accumulating device, with the outside end thereof being secured to the barrel gear, and the inside end being secured to the barrel arbor. The barrel arbor is supported by a main plate and a wheel train bridge, and is secured by a square-hole screw 5 so as to be integrally rotatable with a ratchet wheel 4. The ratchet wheel 4 engages a click 6 so as to allow the ratchet wheel 4 to rotate clockwise, but to prevent it from rotating counterclockwise.

The rotational power from the movement barrel 1 which incorporates the mainspring therein is increased in speed through a wheel train including a second wheel 7, a third wheel 8, a fourth wheel 9, a fifth wheel 10, and a sixth wheel 11 in order to be transmitted to a generator 20.

The generator 20 has a structure similar to that of a driving stepping motor used in a conventional battery-driven type electronic timepiece, and comprises a rotor 12, a stator 15, and a coil block 16.

In the rotor 12, a rotor magnet **12*b* and a rotor inertial disk 12*c* are integrally mounted axially around a rotor pinion 12*a* connected to the sixth wheel 11** for rotation.

A stator coil **15*a* is wound at the outer periphery of the stator 15. The stator 15 has a stator hole (a rotor placing hole or a rotor hole) 15*b* formed at an end thereof in order to rotatably accommodate the rotor magnet 12*b*, has a form defined by a pair of outside notches 15*c* formed at an interval of 180° at the outer periphery of the stator hole 15*b* so as to curve inward towards the hole 15*b*, and has its back end secured to the main plate (not shown) by a screw 21**.

The coil block 16 comprises a coil **16*b* wound upon a magnetic core 16*a*, and both ends thereof are placed upon both ends of the stator 15 and similarly secured together by a pair of screws 21** in order to form them into an integral structure.

PC permalloy is used as a material for constructing the stator 15 and the magnetic core **16*a*, and the stator coil 15*a* and the coil 16*b*** are connected in series so that an output voltage in which each generated electrical power voltage is added is obtained.

Electrical power of the generator 20 obtained by the rotation of the rotor 12 is supplied to an electronic circuit including a crystal oscillator through a capacitor (not shown). The electronic circuit sends a signal for controlling the rotation of the rotor in accordance with a reference frequency and a detection of the rotation of the rotor 12, as a result of which the wheel train rotates at a fixed speed in accordance with a braking force thereof.

This electronic controlling type mechanical timepiece does not require a motor because the mainspring is used as a power source for driving a hand, thereby reducing the number of component parts, and, thus, the cost. In addition, the generator 20 needs to generate only a slight amount of electrical energy to operate the electronic circuit, so that, for the mechanical energy from the mainspring, a slight torque is sufficient.

Oscillating weight timepieces including electrical power generating mechanisms are disclosed in, for example, Japanese Examined Patent Application Publication Nos. 7-38029 and 7-52229. In each of the oscillating weight timepieces, electrical power is generated by rotation of an oscillating weight, and the generated electrical power is accumulated in order to drive a stepping motor by the accumulated electrical power in order to move a hand. Compared to each of these oscillating weight timepieces, the conventional electronic controlling type mechanical timepiece only requires a small amount of electrical power, so that the cogging torque exerted onto the rotor 12 of the generator 20 is very small. More specifically, in each of the oscillating weight timepieces, the cogging torque exerted onto the rotor is usually of the order of $1.0\times10^{-6}$ N m, whereas, in the electronic controlling type mechanical timepiece, it is usually of the order of $4.0\times10^{-9}$ N m, so that, in the electronic controlling type mechanical timepiece, the torque is smaller by approximately a factor of 2 to 3.

Therefore, as in, for example, Japanese Unexamined Patent Application Publication Nos. 8-75873 and 9-203785, in each of the above-described oscillating weight timepieces, the cogging torque is reduced by forming, though in a different location, an inside notch.

In contrast, in the electronic controlling type mechanical timepiece, the cogging torque is extremely small compared to that in each of the oscillating w eight timepieces, so that taking measures to further reduce the cogging torque was not considered.

From the results of assiduous research and development carried out to put the electronic controlling type mechanical timepiece into practical use, the present applicant has discovered the electronic controlling type mechanical timepiece has the following problems which do not arise in the oscillating weight timepieces.

In each of the oscillating weight timepieces, electromotive power of the generator operated by the oscillating weight causes the capacitor to be charged, and the stepping motor driven by the electrical power from the capacitor causes a hand to move. Therefore, even if the generator is temporarily stopped by an external disturbance, the hand continues to move without stopping as long as the capacitor does not discharge.

In contrast to this, in the electronic controlling type mechanical timepiece, a hand is driven in connection with the generator 20, so that, when the generator 20 stops, the hand stops moving immediately, resulting in the problem that an error occurs in the indication of the hand even if the generator starts to operate again.

Since, in the generator of each of the oscillating weight mechanical timepieces, the operation torque exerted onto the rotor by the oscillating weight is very large, no problems arise even if the cogging torque is somewhat large. In addition, in the generator, in order to increase the electromotive voltage, it is sometimes better to make the cogging torque large to make changes in rotationaal speed of the rotor large. Therefore, in the oscillating weight timepiece, it is preferable that, within a range the oscillating weight and the rotor can start moving when, for example, a person moves his or her arm, the cogging torque is made as large as possible in order to make changes in speed of the rotor large. For this reason, as mentioned above, the cogging torque in the oscillating weight timepiece is set so as to be larger than that in the electronic controlling type mechanical timepiece by a factor of 2 to 3.

In contrast, in the electronic controlling type mechanical timepiece, the rotation of the rotor 12 is linked to the movement of a hand, that is, the generator 20 of the electronic controlling type mechanical timepiece not only generates electrical power, but also controls the speed of the hand, so that, when the speed of rotation of the rotor 12 changes, a new problem that the movement of the hand becomes irregular occurs.

In addition, in the electronic controlling type mechanical timepiece, the torque from the mechanical energy accumulating device, such as a mainspring, is very small compared to the torque of, for example, the oscillating weight, so that the difference between the rotational torque exerted onto the rotor 12 and the cogging torque (or pulling torque) of the rotor 12 is small. Therefore, when, in order to increase the length of time the timepiece continues operating, the timepiece is designed so that the speed-increase ratio from a barrel drum to the rotor is made large, the mainspring needs to be maximally wound up each time the rotor 12 at rest while magnetic flux lines are in a stable state is to be started, so that a torque which is larger than the cogging torque needs to be exerted onto the rotor 12. This sometimes leads to the problem that the rotor 12 cannot be readily started.

To overcome the problem that the rotor 12 does not rotate even if the mainspring has been maximally wound up, a lever mechanism (that is, a kicking mechanism) which forces the rotor 12 to rotate when a crown has been pushed may be provided, but, in this case, the structure becomes complicated.

In the case where the generator 20 is operating, when the rotation of the rotor 12 is slowed down due to a disturbance, such as a shock, from outside the timepiece, the rotor 12 may stop rotating because the cogging torque is large, and, in addition, cannot start rotating again by itself, so that the electronic controlling type mechanical timepiece has poor reliability as a timepiece.

On the other hand, when, in order to eliminate these problems, the torque from the mainspring is made large, the number of windings of the mainspring is reduced, resulting in the problem that the length of time the timepiece continues operating is shortened.

In order to decrease the cogging torque of the rotor 12, a magnet with a small number of magnetic flux lines, for example, may be used in order to reduce the number of magnetic flux linkages with the stator 15. However, in this case, the efficiency with which electrical power is generated is reduced.

OBJECTS OF THE INVENTION

Accordingly, it is an object of the present invention to provide an electronic controlling type mechanical timepiece which can more readily perform a starting operation and is more reliable as a result of reliably reducing the cogging torque of a rotor with a simple structure while maintaining the efficiency with which electrical power is generated by obtaining a sufficient number of magnetic, flux linkages with a stator.

DISCLOSURE OF THE INVENTION

The present invention provides an electronic controlling type mechanical timepiece comprising a mechanical energy source including a mechanical energy accumulating device, a generator for supplying electrical energy by generating induced electromotive force as a result of being driven by the mechanical energy source, a rotation controller for controlling a period of rotation of the generator as a result of being driven by the electrical energy, and a time indicator which operates with the rotation of the generator, wherein the generator includes a rotor which rotates by the mechanical energy transmitted from the mechanical energy source, and a stator including a stator hole for disposing the rotor therein, and wherein an adjusting section used for a magnetic balancing adjustment between the stator and the rotor is formed near the stator hole in the stator.

In the present invention, by providing the adjusting section used to perform a magnetic balancing adjustment between the stator and the rotor, the rotor is made to stop at a location away from a location where it essentially stops (that is, the location where it is statically stable when the adjusting section is not formed). In such a state, the adjusting section used to perform a magnetic balancing adjustment acts to stop the rotor when the cogging torque has become small. Therefore, in correspondence with the amount of reduction of the cogging torque, the rotor can be rotated with a slight torque, so that the rotor is more readily started, is not easily stopped by an external disturbance, and is made more reliable. In addition, the adjusting section may be formed by, for example, forming a differently shaped portion such as a notch which is cut away, so that a complicated structure does not need to be used. Further, since it is not necessary to make the number of magnetic flux lines of the magnet small, good electrical power production efficiency can be maintained. Moreover, uneven rotation of the rotor does not easily occur, so that, even when a hand is subjected to a sweeping movement, uneven hand movement does not occur, so that a smooth movement of the hand can be realized. Still further, since the torque used to rotate the rotor may be small, the speed-increase ratio from the mechanical energy source (mechanical energy accumulating device), such as a mainspring, can be made high, so that the mechanical energy accumulating device can correspondingly be made to continue operating for a longer period of time. Due to, the above, the above-described object is achieved.

Here, it is preferable that the adjusting section be an inside notch formed in an inner peripheral surface defining the stator hole. The adjusting section may be formed by embedding a metallic piece formed of a magnetic material, or by changing the thickness of the stator. However, the inside notch can be easily formed by simply cutting away a portion of the stator by, for example, a pressing operation, so that the structure is simplified, and is easily produced.

Here, it is preferable that the inside notch have a shape coefficient K that is at least 0.0005 $mm^2$ and at most 0.125 $mm^2$. As described later, the shape coefficient K is primarily proportional to the area of the inside notch. When the coefficient is less than 0.0005 $mm^2$, that is, when the area of the inside notch becomes smaller, the effect of forming the inside notch becomes small, thus approaching the case where the inside notch is not formed. This makes the inside notch less effective in reducing the cogging torque. On the other hand, when the shape coefficient K is greater than 0.125 $mm^2$, a magnetic imbalance results, thereby increasing the absolute value of the cogging torque. Therefore, the rotor tends to stop. In contrast, if the inside notch is formed so that its shape coefficient K is within the aforementioned range, the absolute value of the cogging torque can be made small. In addition, when the aforementioned shape coefficient K is used, it is possible to bring about a condition where the cogging torque is made substantially "0" regardless of the strength and size of the magnet, the sizes of the stator hole and the magnet gap and the shape of the inside notch, as shown in FIG. 7. Therefore, an inside notch which can reduce the cogging torque to substantially "0" can be easily formed.

Here, it is more preferable that the shape coefficient K of the inside notch be at least 0.07 $mm^2$ and at most 0.125 $mm^2$. Within this range, the cogging torque can be reduced even more.

It is also preferable that the inside notch be formed into a semicircular shape, and have a radius which is at least 0.05 mm and at least 0.20 mm. Considering the size of the generator determined by the size of a generally used wristwatch, or, more specifically, for example, the sizes of the rotor and the stator hole, and the materials and thicknesses thereof, if the aforementioned dimensional range is used, the shape coefficient K falls within the aforementioned range, so that the cogging torque can be reduced.

It is preferable that the inside notch be formed in accordance with a direction of a magnetic pole of the rotor when the rotor is statically stable without the inside notch being formed.

In the present invention, by forming the notch in a portion whose location corresponds to a location where the rotor essentially stops (that is, a location where the rotor is statically stable when the notch is not formed), the cogging torque can be effectively decreased. When the cogging torque can be decreased, the rotor rotates with a slight torque, so that the rotor can be more readily started, does not easily stop due to an external disturbance such as a mechanical shock, and becomes more reliable, and the efficiency with which electrical power is generated is increased.

The inside notch may be formed within a predetermined angle range from a center of the rotor with respect to the direction of the magnetic pole of the rotor when the rotor is stopped at the location where the rotor is statically stable (that is, the location where the rotor is stopped by the cogging torque when the notch is not formed). More specifically, "forming the inside notch in correspondence with the direction of the magnetic pole of the rotor" not only means that it is formed at a location in exact alignment with the direction of the magnetic pole of the rotor, but also that it is formed within a certain angle range from the direction of the magnetic pole of the rotor being defined as a center.

In particular, it is preferable that the inside notch be formed within an angle range of ±40 degrees from the center of the rotor with respect to the direction of the magnetic pole of the rotor when the rotor is statically stable. It is even more preferable that it be formed within an angle range of ±4 degrees. When the inside notch is formed within these angle ranges, the cogging torque is less than the cogging torque produced when the inside notch is not formed. In particular, when it is formed within the angle range of ±4 degrees, the cogging torque can be reduced to a value of the order of approximately ⅕ of the cogging torque produced when the inside notch is not formed.

It is preferable that the mechanical energy accumulating device be a mainspring, with the mechanical energy accumulated in the mainspring being transmitted to the generator through a mechanical energy transmitting device which is a wheel train.

The mainspring and the wheel train make it easier to reduce size and can be incorporated in wristwatches. In addition, in the present invention, since the cogging torque of the rotor can be effectively reduced, the torque exerted onto the rotor from the mainspring through the wheel train can be made relatively small. Thus, the torque of the mainspring can be increased in speed, so that the mainspring can correspondingly be made to continue operating for a longer period of time.

BEST MODE FOR CARRYING OUT THE INVENTION

Hereunder, a description of each embodiment of the present invention will be given with reference to the drawings.

[First Embodiment]

Figure 1:
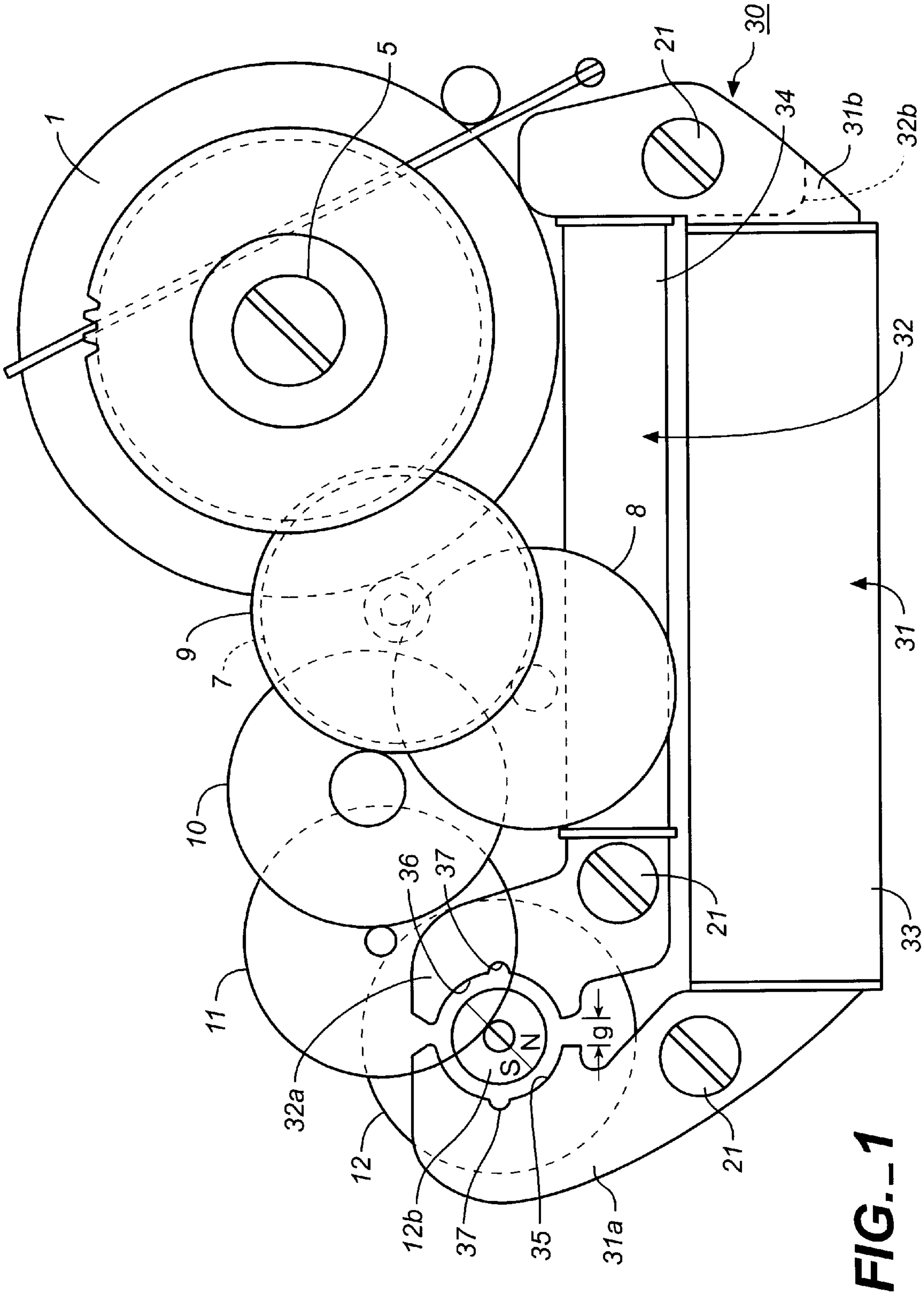
FIG. 1 is a plan view of a first embodiment of the electronic controlling type mechanical timepiece in accordance with the present invention.
Figure 2:
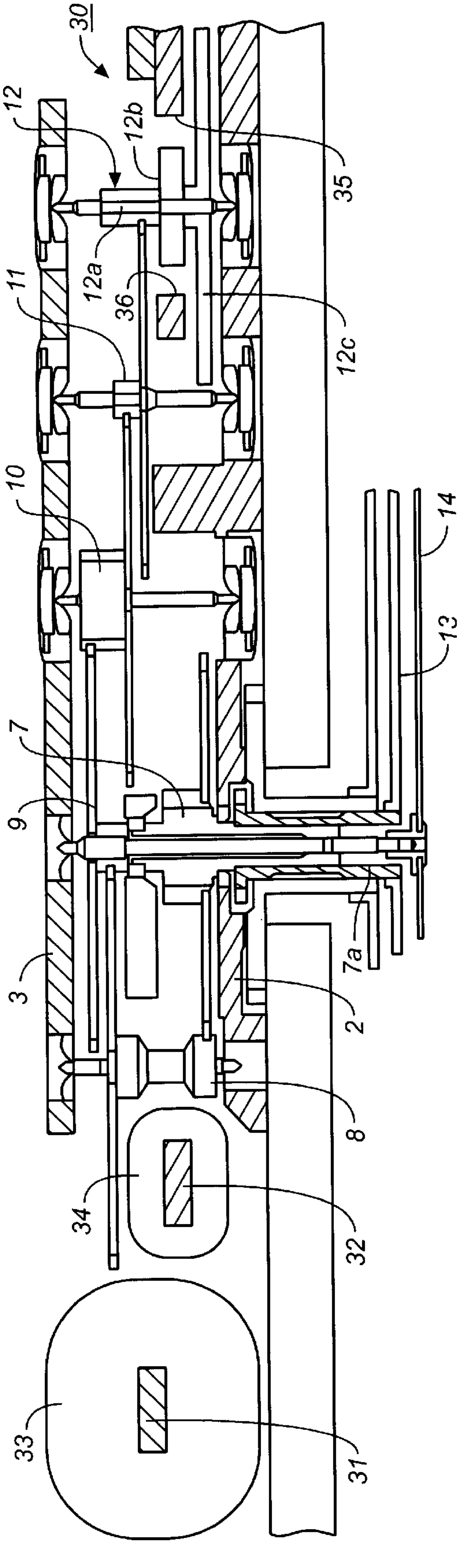
FIG. 2 is a sectional view of the main portion of FIG. 1.
Figure 3:
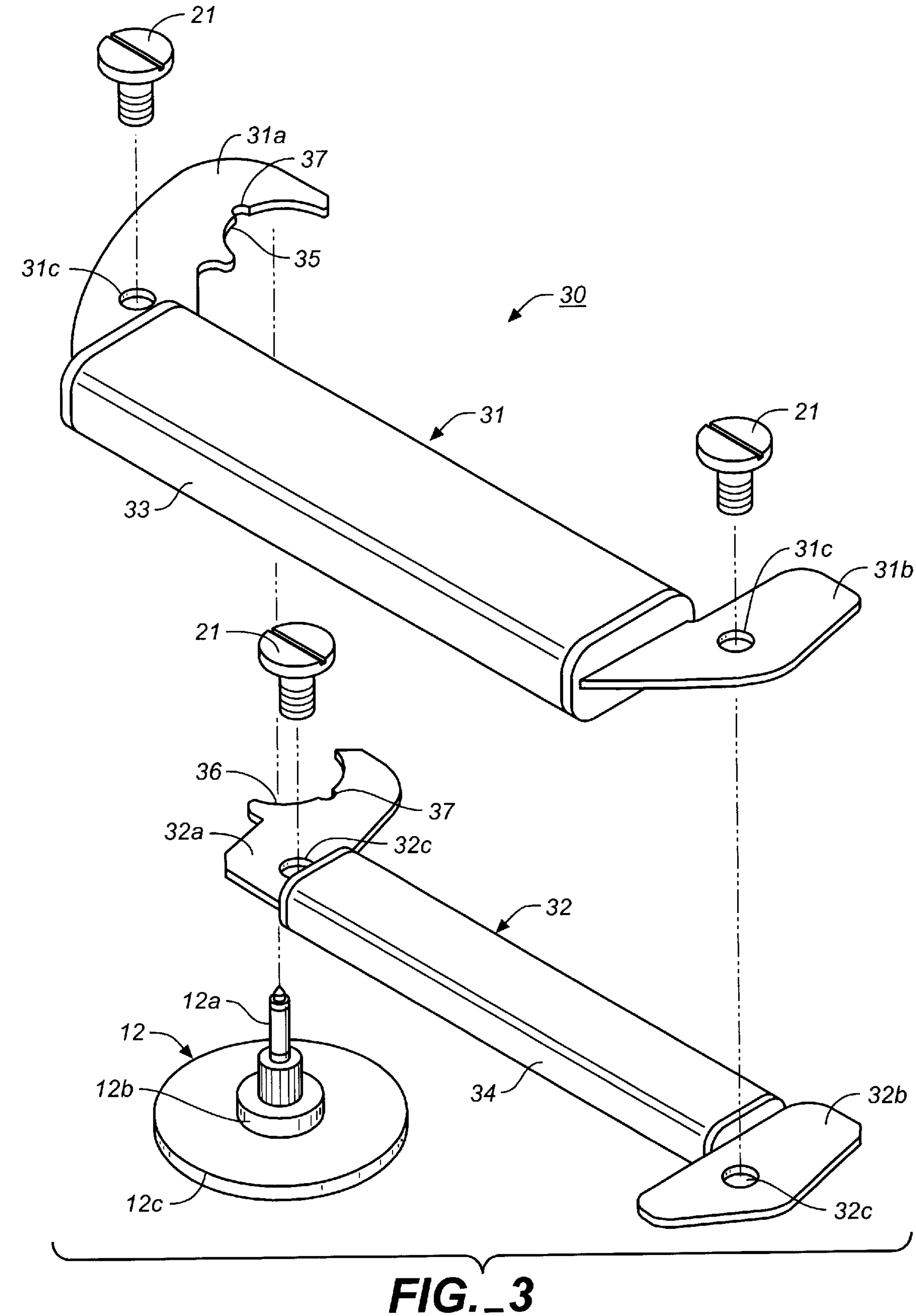
FIG. 3 is an exploded perspective view of a generator.

FIGS. 1 to 3 illustrate a first embodiment of the present invention. In each of these figures, only the main portion of the structure of a generator 30 differs, from that of the conventional generator, so that component parts similar or corresponding to those of the conventional timepiece are given the same reference numerals, whereas dissimilar parts or parts which need to be explained further are given different reference numerals and are described below.

In these figures, similar to the conventional timepiece, rotational power from a movement barrel 1 incorporating a mainspring serving as a mechanical energy accumulating device is increased in speed through a wheel train servings as a mechanical energy transmission device, and transmitted to the generator 30 used in the present invention.

The rotational motion of a gear of the movement barrel 1 is increased seven times in speed and transmitted to a second wheel 7. Then, it is increased 6.4 times in speed and transmitted to a third wheel 8. Then, it is increased 9.375 times in speed and transmitted to a fourth wheel 9. Then, it is increased 3 times in speed and transmitted to a fifth wheel 10. Then, it is increased 10 times in speed and transmitted to a sixth wheel 11. Then, it is increased 10 times in speed and transmitted to a rotor 12 of the generator 30 used in the present invention. Therefore, the speed of the rotational motion is increased by a total of 126,000 times the original speed in order to transmit power thereof.

As shown in FIG. 2, a cannon pinion 7*a* is secured to the second wheel 7, a minute hand 13 is secured to the cannon pinion 7*a*, and a second hand 14 is secured to the fourth wheel 9. Therefore, in order to rotate the second wheel 7 at 1 rph, and the fourth wheel 9 at 1 rpm, the rotor 12 is controlled so as to rotate at 5 rps. In FIG. 2, reference numeral 2 denotes a main plate, and reference numeral 3 denotes a wheel train bridge.

The rotor 12 of the generator 30 is essentially the same as the conventional one. The stator is disposed on the main plate 2, at the same location that the stator of the conventional generator is disposed. As shown in detail in FIGS. 1 and 3, coils 33 and 34 having different numbers of windings are wound upon respective stators 31 and 32 having the same widths and corresponding to magnetic cores of a coil block. The outside dimension of a portion of the coil block at the stator 32 side is smaller because the third wheel 8 overlaps it. In addition, the coils 33 and 34 are connected in series.

Semicircular stator holes (rotor disposing holes or rotor holes) 35 and 36 are formed so as to oppose each other in opposing locations of front ends 31*a* and 32*a* of both stators 31 and 32, respectively, and are used to rotatably accommodate a rotor magnet 12*b*. Holes 31*c* and 32*c* for inserting a screw 21 are formed in the front ends 31*a* and 32*a*, respectively, in order to separately secure them to the main plate 2.

In order to connect the stators 31 and 32 to form a magnetic path, back ends 31*b* and 32*b* of both stators 31 and 32 are formed into shapes which allow them to overlap each other. Insertion holes (or screw holes) 31*c* and 32*c* are formed in the centers of overlapping portions of the back ends 31*b* and 32*b*, respectively, in order to insert a common screw 21 into the insertion holes 31*c* and 32*c*, and to secure them together to the main plate 2.

Therefore, when the stators 31 and 32 are in an assembled state, the stator holes 35 and 36 separated from each other through predetermined gaps g at the center portions thereof are disposed so as to surround the outer periphery of the rotor magnet 12*b*.

Opposing inside notches 37 which are indentations serving as adjusting sections curving outward are formed in both stator holes 35 and 36, at locations at 90 degrees from the gaps g with respect to the axis of rotation of the rotor. These inside notches 37 are used to perform magnetic balancing adjustments between the stators 31 and 32 and the rotor 12.

Figure 4:
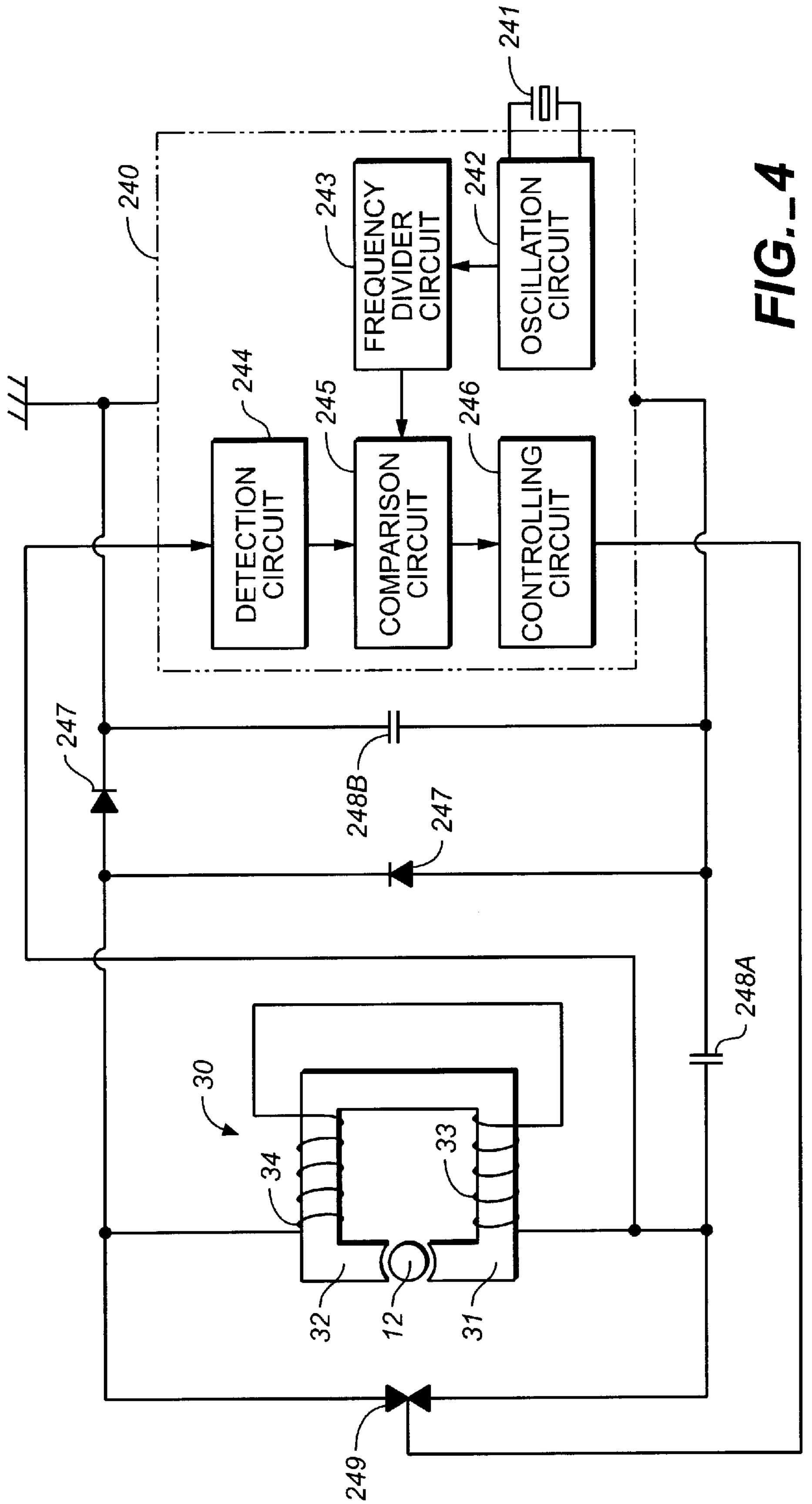
FIG. 4 is a circuit block diagram showing a state in which the generator and an electronic circuit in the first embodiment of the present invention are connected.

As shown in FIG. 4, the coils 33 and 34, connected in series, are used to generate electromotive forces, detect the rotation of the rotor 12, and control the rotation of the generator 30. More specifically, the electromotive forces in the coils 33 and 34 are used to drive an electronic circuit 240, such as an IC, in order to detect the rotation of the rotor 12 and to control the rotation of the generator 30. The electronic circuit 240 includes an oscillation circuit 242 for driving a crystal oscillator 241; a frequency divider circuit 243 for generating a reference frequency signal which is a time signal based on a clock signal generated by the oscillation circuit 242; a detection circuit 244 for detecting the rotation of the rotor 12; a comparison circuit 245 for comparing the period of rotation obtained at the detection circuit 244 and the reference frequency signal in order to output the difference therebetween; and a controlling circuit 246 for sending a control signal to the generator 30 based on the difference in order to perform a braking operation. Therefore, the electronic circuit 240 comprises a rotation controlling device for controlling the period of rotation of the generator 30. Instead of the crystal oscillator 241, various standard reference oscillation sources or the like may be used to generate the clock signal.

Each of the circuits 242 to 246 is driven by electrical power generated by the coils 33 and 34 connected in series, so that, when the rotor 12 of the generator 30 is subjected to the rotational motion transmitted from the wheel train and is rotated in one direction, an alternating-current output is generated at each of the coils 33 and 34. The outputs are increased in pressure and rectified by a pressure-increasing rectifying circuit comprising a diode 247 and a capacitor 248A, and electrically charge a capacitor 248B. The capacitor 248B drives the controlling circuit (electronic circuit) 240 by the electrical current which charges it.

Part of the alternating-current output of each of the coils 33 and 34 is extracted as a detecting signal of the period of rotation of the rotor 12, and is input to the detection circuit 244. The output waveform output from each of the coils 33 and 34 is an exact sine wave produced every one period of rotation. Therefore, the detection circuit 244 subjects the signals to A/D conversion to form pulse signals in a time series. The comparison circuit 245 compares the detection signals with the reference frequency signal, after which the controlling circuit 246 sends a control signal generated in correspondence with the difference between the detection signals and the reference frequency signal to a short-circuiting section 249 which functions as a braking circuit for each of the coils 33 and 34.

Based on the control signal from the controlling circuit 246, the short-circuiting section 249 short-circuits both ends of the coils 33 and 34 in order to brake the rotor 12 and regulate the period of rotation of the rotor 12.

Figure 5:
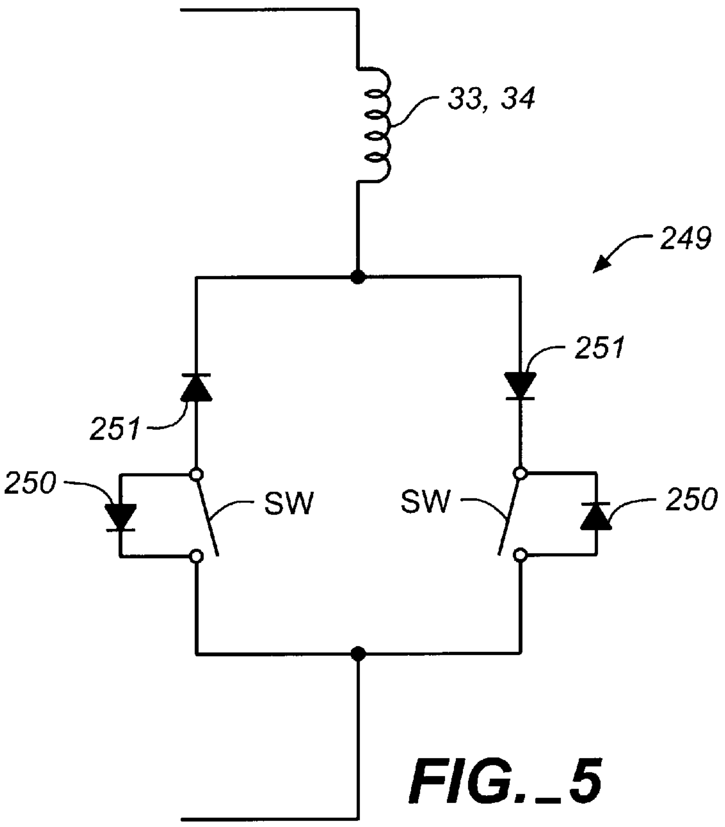
FIG. 5 is a circuit diagram showing the circuit of FIG. 4 in a closed state.

As shown in FIG. 5, the short-circuiting section 249 includes a bidirectional switch comprising a pair of diodes 251 which pass electrical currents flowing in opposite directions; switches SW connected parallel to the respective diodes 251; and parasitic diodes 250 connected to the respective switches SW in series. This allows a braking controlling operation to be carried out using a full wave of the alternating current output from each of the coils 33 and 34, so that the braking amount is made large.

A description of the above-described inside notches 37 which are characteristic of the present invention are described in more detail below.

Figure 6:
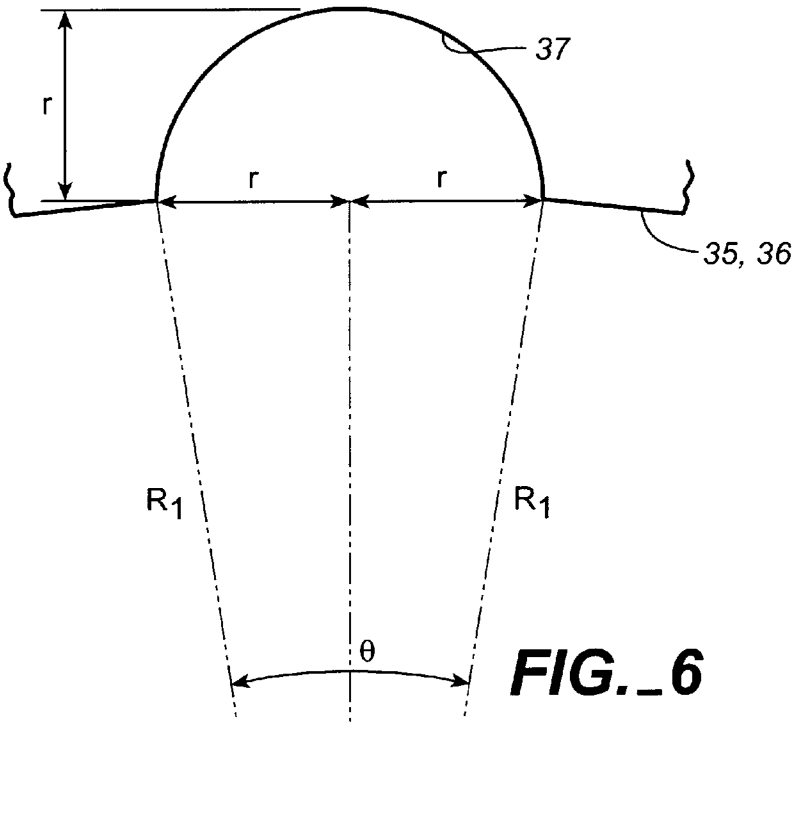
FIG. 6 is an enlarged view of an adjusting section in the first embodiment.

As shown in enlarged form in FIG. 6, each inside notch 37 has a semicircular shape with a radius r, which is determined in the following way.

More specifically, first, as shown in Table 1 below, a plurality of stators 31 and 32 having corresponding inside notches 37 with different radii r (0.00 mm, 0.05 mm, 0.10 mm, 0.20 mm, and 0.25 mm) were used, and the cogging torque of rotor 12 corresponding to each of these cases was previously measured.

Here, a radius $R_1$ of each of stator holes 35 and 36 was 1.5 mm. The thickness of a rotor magnet was 0.4 mm and a magnet material with a maximum energy product BHmax32MGOe (that is, 254.7 $KJ/m^3$ in international system of units) was used. In the measurements, three types of rotor magnets 12*b* with different radii $R_2$ (of 0.5 mm, 0.625 mm, and 0.675 mm) were used, but only one type of rotor magnet 12*b* may also be used. Considering, for example, the required power-generation capability, the actual measurements may be carried out with the rotor magnet or magnets with the radius or radii used in carrying out the invention. The measured cogging torques when the inside notches 37 with different radii are used are shown in Table 1 below. The corresponding cogging torques of Table 1 in international system of units are shown in Table 1-2.

TABLE 1

| Radius of rotor magnet $R_2$ (mm) | Cogging Torques Ti, T (mgmm) | | | | | |
|---|---|---|---|---|---|---|
| | Radius r of inside notch (mm) | | | | | |
| | Ti | T | | | | |
| | 0.0 | 0.05 | 0.10 | 0.15 | 0.20 | 0.25 |
| 0.675 | 4.15 | 3.66 | 3.44 | 1.90 | −3.10 | −6.23 |
| 0.625 | 3.24 | 2.71 | 2.31 | 1.44 | −2.17 | −4.49 |
| 0.500 | 1.45 | 1.23 | 1.07 | 0.31 | −0.87 | −1.92 |

TABLE 1-2

| Radius of rotor magnet $R_2$ (mm) | Cogging Torques Ti, T (N m) | | | | | |
|---|---|---|---|---|---|---|
| | Radius r of inside notch (mm) | | | | | |
| | Ti | T | | | | |
| | 0.0 | 0.05 | 0.10 | 0.15 | 0.20 | 0.25 |
| 0.675 | $4.07 \times 10^{-8}$ | $3.59 \times 10^{-8}$ | $3.37 \times 10^{-8}$ | $1.86 \times 10^{-8}$ | $-3.04 \times 10^{-8}$ | $-6.11 \times 10^{-8}$ |
| 0.625 | $3.18 \times 10^{-8}$ | $2.66 \times 10^{-8}$ | $2.26 \times 10^{-8}$ | $1.41 \times 10^{-8}$ | $-2.13 \times 10^{-8}$ | $-4.40 \times 10^{-8}$ |
| 0.500 | $1.42 \times 10^{-8}$ | $1.21 \times 10^{-8}$ | $1.05 \times 10^{-8}$ | $0.30 \times 10^{-8}$ | $-0.85 \times 10^{-8}$ | $-1.88 \times 10^{-8}$ |

Figure 7:
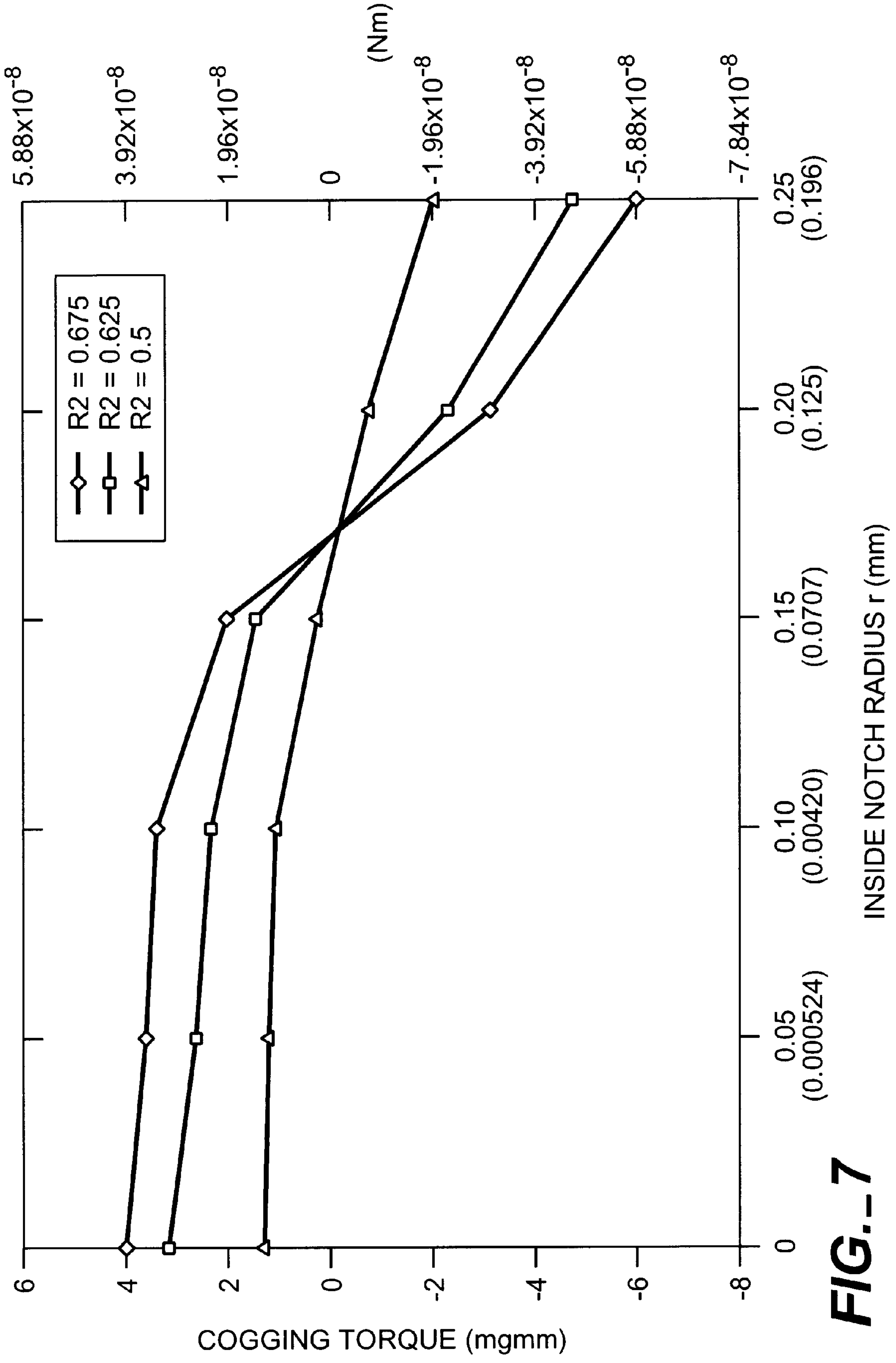
FIG. 7 illustrates a graph showing the relationship between an adjusting section used in the first embodiment and the measured cogging torque.

In order to determine the relationship between the radius r of each notch 37 and the cogging torque, as shown in FIG. 7, the radius r is placed along the horizontal axis and the cogging torque is placed along the vertical axis for calibration, and the measured values are plotted and connected together to form a graph.

As shown in the graph of FIG. 7, it can be understood that the cogging torque (that is, the initial cogging torque Ti in Table 1) produced when the radius r of each inside notch 37 is zero (that is, when there are no inside notches 37) gradually decreases as the radius r of each notch 37 becomes larger. This is because the formation of each notch 37 causes the initial cogging torque Ti to be cancelled. When the radius r of each inside notch 37 is too large, the action produced by each inside notch 37 becomes too strong and greater than its respective initial cogging torque Ti, so that the rotor 12 cannot be started readily.

Therefore, the radius r of each inside notch 37 is determined so as to fall within a range when the cogging torque is zero or close to zero. From the graph of FIG. 7, regardless of the size of radius $R_2$ of each rotor magnet 12*b* (if the size of each rotor magnet 12*b* is of the order of a size of a commonly used rotor magnet 12*b*), an optimal range of the radius r of each inside notch is from 0.10 to 0.20 mm, and preferably from 0.15 to 0.20 mm. In FIG. 7 and each of the graphs used in the description below, when the vertical axis (the left axis) is calibrated in gravitational units, the right axis is correspondingly calibrated in international system of units.

The radius r of each inside notch 37 is determined as described above.

The embodiment provides the following advantages:

1) The rotor 12 (with no inside notches 37) essentially stops at a location where it is magnetically most stably balanced, that is, at a location where a boundary line between the magnetic poles N and S becomes parallel to a straight line connecting the gaps g at both sides. In the embodiment, the inside notches 37 used for performing a magnetic balancing adjustment between the stators 31 and 32 and the rotor 12 are formed in the inner peripheries of the respective stator holes 35 and 36, making it possible to stop the rotor 12 at a location displaced from the location where it essentially stops, and, thus, to cause the rotor 12 to cancel the initial cogging torque Ti. This decreases the cogging torque acting on the rotor 12, and allows the rotor 12 to rotate with a slight torque. Therefore, the rotor 12 can be more readily started, and stops less often due to an external disturbance, thus making it more reliable. In addition, the mainspring only needs to apply a small torque to the rotor 12, making it possible to increase the speed-increase ratio of the wheel train, and, thus, to increase the length of time the timepiece continues operating.

Further, the inside notches 37 can be easily formed by simply cutting them out from their respective stator holes 35 and 36 by pressing or the like, so that they can be structurally simplified.

In reducing the cogging torque, it is not necessary to decrease the number of flux lines by, for example, decreasing the size of the rotor magnets 12*b*, thus making it possible to maintain good electrical power generation efficiency.

2) Since the cogging torque of each rotor magnet 12*b* is decreased by forming the inside notches 37 in the respective stators 31 and 32, the rotational movement of the rotor 12 can be made smoother. Therefore, a hand can be subjected to a sweeping movement, and a smooth hand movement can be realized without any uneven movement.

3) From the relationship between the previously actually measured cogging torque and the radius r of each inside notch 37, the radius r of each inside notch 37 is determined so as to fall within an optimal range obtained when the cogging torque is '0' or a value close to '0', so that the cogging torque can be reliably decreased. In addition, since it is only necessary to repeat the measurements a predetermined number of times, unnecessary measurements do not have to be carried out, making it possible to easily and quickly determine each exact radius r.

4) Since the rotor magnets 12*b* each include two magnetic poles N and S which divide a peripheral-direction portion into two parts, it is easier to perform a magnetic balancing adjustment in each of the rotor magnets 12*b* than in a rotor magnet in which a portion is divided into a larger number of parts, thereby making it easier to further decrease the cogging torque.

Figure 28:
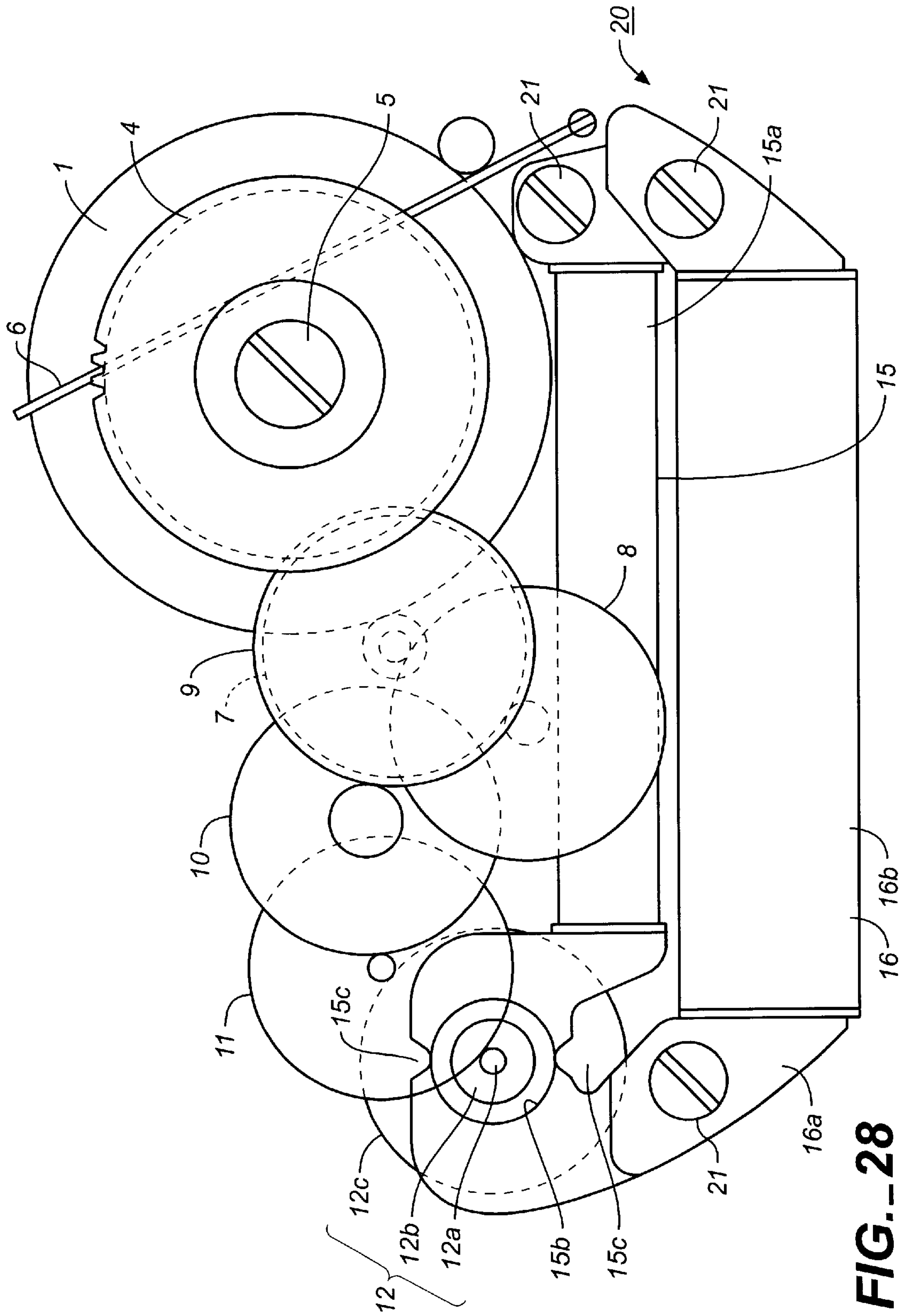
FIG. 28 is a plan view of a conventional electronic controlling type mechanical timepiece including a generator.
Figure 29:
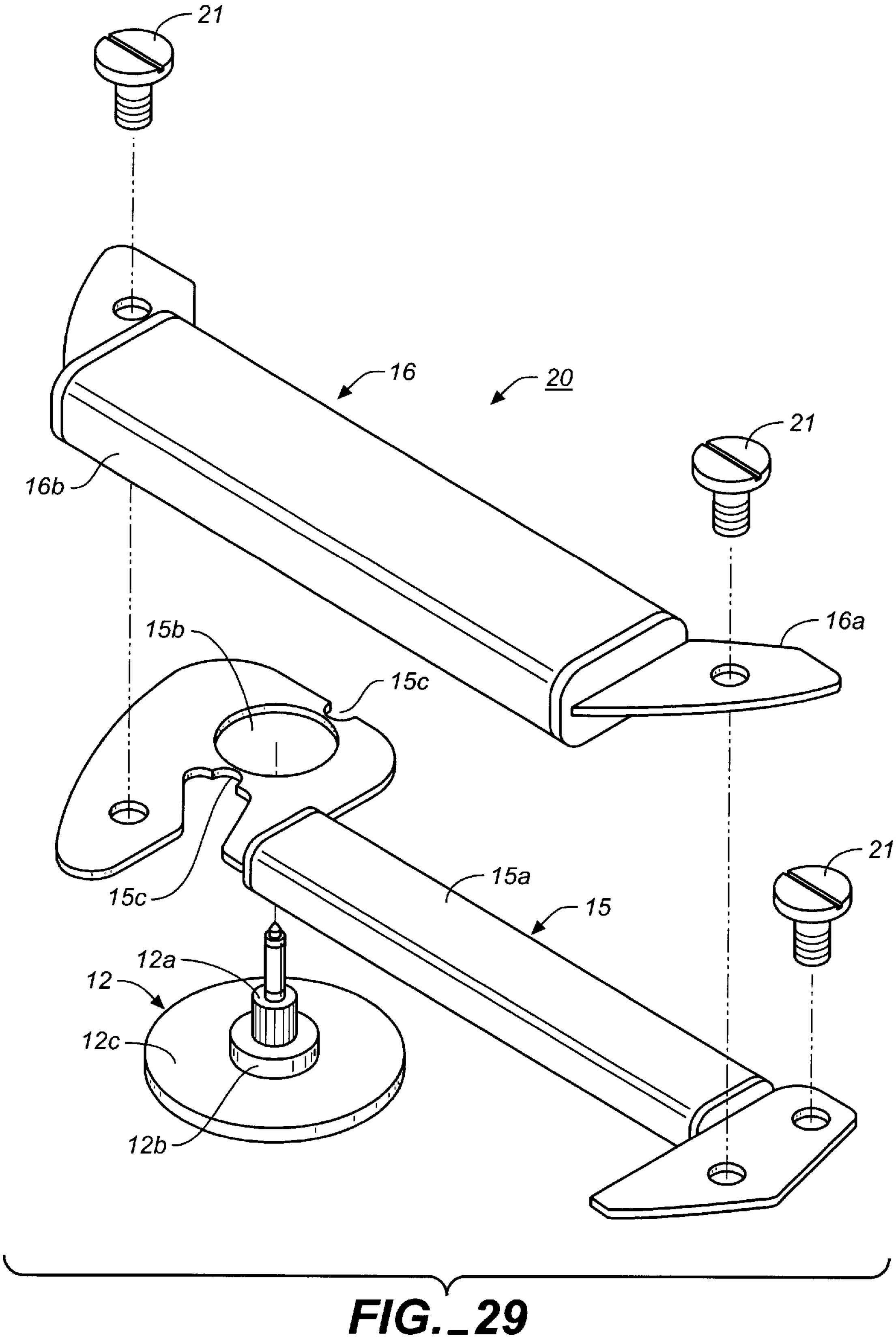
FIG. 29 is an exploded perspective view of the generator of FIG. 28.

5) Unlike the conventional timepiece shown in FIGS. 28 and 29, two stators 31 and 32 are used in the embodiment, so that, compared to the case where the conventional outside notches 15*c* are used, the electromotive voltage can be increased, and, compared to the conventional output waveforms, the waveforms can be precisely formed into sine waves with every cycle.

Therefore, the electrical-power generation capability of the generator 30 is enhanced, and, when an electromotive voltage equal to that obtained in the conventional timepiece is to be obtained, the generator 30 can be made smaller in size. In addition, since the output waveforms become sine waves, the output waveforms can be easily detected by dividing them with suitable threshold values and performing binary operations, thereby making it easier to detect, for example, the rotational frequency of the rotor 12. Therefore, the timepiece using the output waveforms of the generator 30 can be precisely and easily controlled.

6) Since the stators 31 and 32 do not have weak sections formed due to structural reasons such as a cantilever support using stator holes, or easily deformable portions such as the notches 15*c* (FIGS. 28 and 29), they can be easily handled. Thus, they can be properly handled in each step, making it possible to prevent a reduction in yield.

7) Since the portion of the stator 31 near the stator hole 35 and the portion of the stator 32 near the stator hole 36 are secured with the screw 21, the precision with which the stator holes 35 and 36 are positioned with respect to the rotor 12 can be increased.

8) The back ends 31*b* and 32*b* of the two respective stators 31 and 32 are directly connected together with the screw 21, making it possible to form an annular loop in which magnetic flux lines flow using the two stators 31 and 32 alone, thereby making it easier for the magnetic flux lines to flow as a result; of decreasing the number of contacts, and making it possible to restrict the number of component parts used.

9) Since the short-circuiting circuit 249 connected to each of the coils 33 and 34 comprises a bidirectional switch, a full wave can be used to increase the amount of braking, so that the braking can be effectively controlled.

[Second Embodiment]

Hereunder, a description of a modification of the method of determining radius r of each inside notch 37 will be given as a second embodiment of the present invention.

Based on assiduous research, the present applicant has theoretically found out that, by forming inside notches 37, the torque determined by Formula (1) below acts on the rotor 12. Here, C and m are constants, and F represents the torque coefficient.

$$T = C \cdot F^m \tag{1}$$

The torque coefficient F is determined by Formula (2) below. Here, $\phi$ (Mx) represents the total number of magnetic flux lines of each rotor magnet 12*b*, K ($mm^2$) represents the shape coefficient of each inside notch 37, $R_1$ represents the radius of each of the stator holes 35 and 36, and $R_2$ represents the radius of each rotor magnet.

$$F = \frac{\phi \cdot K}{(R_1 - R_2)^2} \tag{2}$$

The shape coefficient K is determined by Formula (3). Here, n is a constant determined by the number of inside notches 37, in which, when there is one inside notch 37, the constant is ½, whereas, when there are two inside notches 37, it is 2. S ($mm^2$) represents the projection area of one inside notch 37, and is determined by Formula (4). θ (rad) is the opening angle (FIG. 6) of each inside notch 37 opening towards the center position of each of the corresponding stator holes 35 and 36, and π is the ratio of the circumference of a circle to its diameter.

$$s = \frac{\pi r^2}{2} \tag{4}$$

Therefore, in Formula (1), when the action on each inside notch is substituted for its corresponding initial cogging torque (in Table 1), the torque coefficient F is obtained by an inverse operation. When an inverse operation is carried out again, the optimal radius r of each inside notch required to cancel the initial cogging torque Ti can be obtained.

In other words, the torque coefficient F corresponding to the initial cogging torque Ti is obtained by transforming the above-described Formula (1) into Formulas (5) and (6).

$$F = \left(\frac{Ti}{C}\right)^m \tag{6}$$

When the torque coefficient F obtained using Formula (6) is substituted into the following Formula (7) formed by transforming the above-described Formula (2), the shape coefficient K in correspondence with the initial cogging torque Ti is obtained.

$$K = \frac{(R_1 - R_2)^2 \cdot F}{\phi} \tag{7}$$

Next, when the shape coefficient K obtained using Formula (7) is substituted into the following Formula (8) formed by transforming the above-described Formulas (3) and (4), the radius r of each notch 37 is obtained. Here, since the radius r of each notch 37 is sufficiently small compared to the radius $R_1$ of each of the corresponding stator holes 35 and 36, the opening angle θ of each notch 37 is replaced by $2\times r/R_1$.

$$r = \left(\frac{K \cdot R_1}{n \cdot \pi}\right)^{\frac{1}{3}} \tag{8}$$

Therefore, as described above, since the initial cogging torque Ti when no inside notches 37 are formed can be actually measured, when the constants C and m which are not known in Formula (5) are determined, an optimal value for each radius r can be calculated from Formulas (6) to (8).

As in the first embodiment, the constants C and m can be obtained by obtaining the relationship between each of the torque coefficients F and each of the measured cogging torques using the plurality of stators 31 and 32 in which radii $R_1$ are the same but radii r are different, and calculating the torque coefficient F for each of the stators 31 and 32 from the Formulas (2) to (4).

Hereunder, one way of determining the constants C and m when the stator holes 35 and 36 having radii $R_1$ of 3 mm will be described based on the measured values when each of the stators 31 and 32 (with the inside notches having different radii r) used in the first embodiment, and each of the rotor magnets **12*b*** (with a different radius $R_2$) are used.

First, the torque coefficient F of each of the stators 31 and 32 and each of the rotor magnets **12*b* is obtained using the Formulas (2) to (4). These results are shown in Table 2 along with the other values. Here, each opening angle θ is obtained by an inverse sine function of each of the radii $R_1$ and radii r (FIG. 6). The total number of magnetic flux lines φ of each of the rotor magnets 12*b*** can be obtained by a general formula from, for example, the characteristic magnetic flux density and thickness of each magnet.

When the action produced by providing each of the inside notches is defined as Ta, each value obtained by subtracting each value Ta from its corresponding initial cogging torque Ti, that is, Ti−Ta is measured as a cogging torque obtained when each of the inside notches is provided. Therefore, it is desirable that each of the inside notches be added so that each "Ti−Ta" value is substantially 0. When each inside notch is too large, each "Ti−Ta" value becomes negative, so that each cogging torque becomes greater than 0. Table 2 shows the Ta values when the inside notches are provided.

TABLE 2

| Radius $R_1$ (mm) of stator hole | Radius $R_2$ (mm) of rotor magnet | Radius r (mm) of inside notch | Total number of magnetic flux lines φ (Mx) | Shape coefficient K ($mm^2$) | Torque coefficient F | Action by inside notch Ta (mg-mm) |
|---|---|---|---|---|---|---|
| 3 | 0.5 | 0.05 | 14.9 | $5.240 \times 10^{-4}$ | 0.780741 | 0.22 |
| 3 | 0.5 | 0.10 | 14.9 | $42.013 \times 10^{-4}$ | 6.25994 | 0.38 |
| 3 | 0.5 | 0.15 | 14.9 | $142.332 \times 10^{-4}$ | 21.2074 | 1.14 |
| 3 | 0.5 | 0.20 | 14.9 | $339.208 \times 10^{-4}$ | 50.54193 | 2.32 |
| 3 | 0.05 | 0.25 | 14.9 | $667.268 \times 10^{-4}$ | 99.42296 | 3.37 |
| 3 | 0.625 | 0.05 | 23.3 | $5.240 \times 10^{-4}$ | 1.594633 | 0.53 |
| 3 | 0.625 | 0.10 | 23.3 | $42.013 \times 10^{-4}$ | 12.78568 | 0.93 |
| 3 | 0.625 | 0.15 | 23.3 | $142.332 \times 10^{-4}$ | 43.31526 | 1.80 |
| 3 | 0.625 | 0.20 | 23.3 | $339.208 \times 10^{-4}$ | 103.2299 | 5.41 |
| 3 | 0.625 | 0.25 | 23.3 | $667.268 \times 10^{-4}$ | 203.0674 | 7.73 |
| 3 | 0.675 | 0.05 | 27.2 | $5.240 \times 10^{-4}$ | 2.094025 | 0.49 |
| 3 | 0.675 | 0.10 | 27.2 | $42.013 \times 10^{-4}$ | 16.78978 | 0.71 |
| 3 | 0.675 | 0.15 | 27.2 | $142.332 \times 10^{-4}$ | 56.88033 | 2.25 |
| 3 | 0.675 | 0.20 | 27.2 | $339.208 \times 10^{-4}$ | 135.5584 | 7.25 |
| 3 | 0.675 | 0.25 | 27.2 | $667.268 \times 10^{-4}$ | 266.6622 | 10.38 |

Ta produced by each inside notch in Table 2 is shown in international system of in Table 2-1.

TABLE 2-1

| Action Ta (mgmm) produced by inside notch | Converted value Ta (N.m) |
|---|---|
| 0.22 | $2.16 \times 10^{-9}$ |
| 0.38 | $3.72 \times 10^{-9}$ |
| 1.14 | $1.12 \times 10^{-8}$ |
| 2.32 | $2.27 \times 10^{-8}$ |
| 3.37 | $3.30 \times 10^{-8}$ |
| 0.53 | $5.19 \times 10^{-9}$ |
| 0.93 | $9.11 \times 10^{-9}$ |
| 1.80 | $1.76 \times 10^{-8}$ |
| 5.41 | $5.30 \times 10^{-8}$ |
| 7.73 | $7.58 \times 10^{-8}$ |
| 0.49 | $4.80 \times 10^{-9}$ |
| 0.71 | $6.96 \times 10^{-9}$ |
| 2.25 | $2.21 \times 10^{-8}$ |

TABLE 2-1-continued

| Action Ta (mgmm) produced by inside notch | Converted value Ta (N.m) |
|---|---|
| 7.25 | $7.11 \times 10^{-8}$ |
| 10.38 | $1.02 \times 10^{-7}$ |

Figure 8:
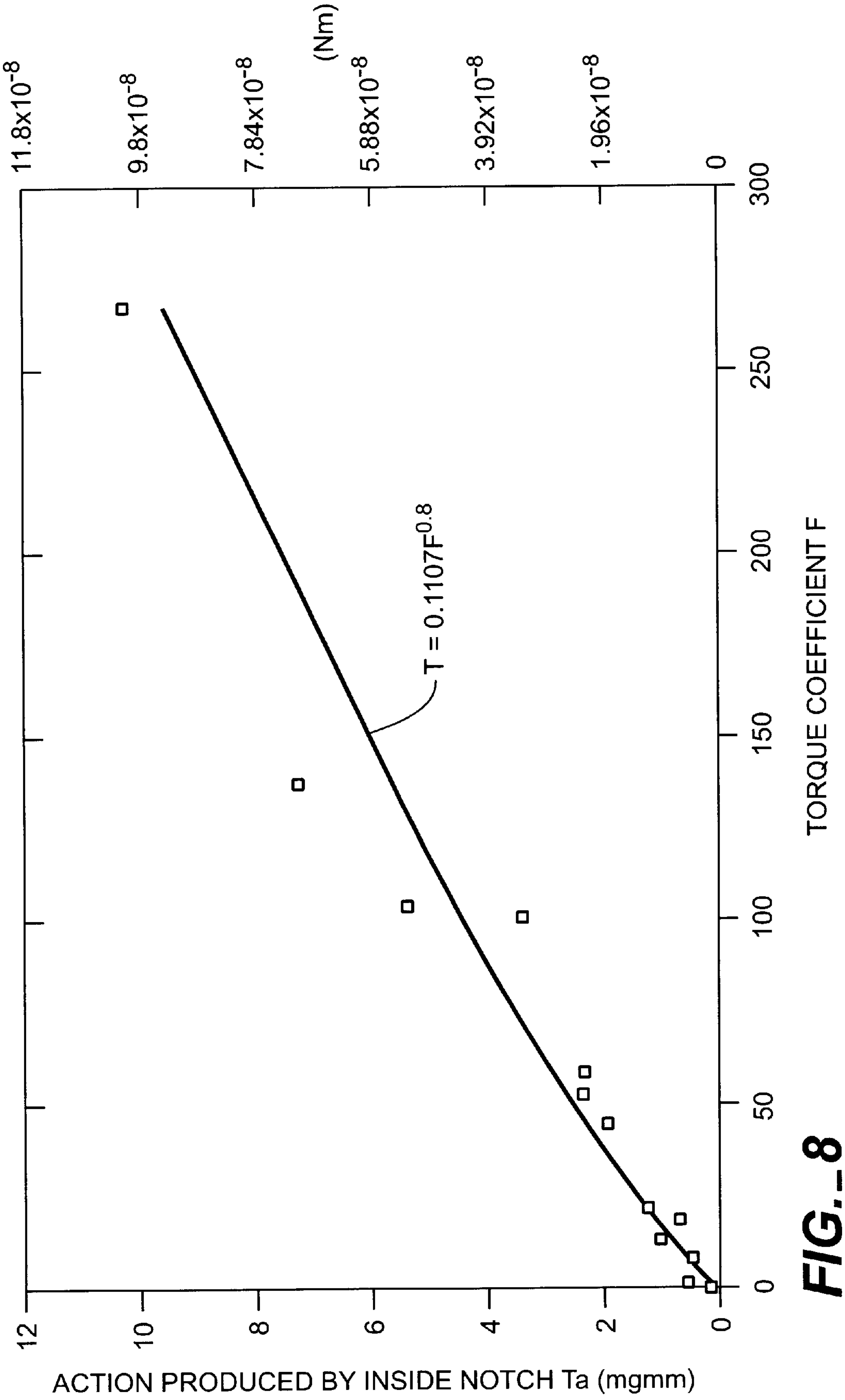
FIG. 8 illustrates a graph showing the relationship between the torque coefficient and the cogging torque in a second embodiment of the present invention.

Then, a graph shown in FIG. 8 is created by plotting the thus-obtained torque coefficients F and actions Ta produced by the inside notches. In creating the graph, it is not necessary to use the values of all three types of rotor magnets 12*b* with different radii $R_2$, so that all that needs to be done is to plot the values regarding one of the rotor magnets with radius $R_2$ used in carrying out the invention. However, since the graph showing the relationship becomes more reliable with an increasing number of plotted points on the graph, it is preferable to follow what is stated in the embodiment.

Then, based on the torque coefficients F and the actions Ta produced by the inside notches shown in Table 2, and the graph shown in FIG. 8, the relationship between the torque coefficient F and the action Ta produced by each inside notch is represented by an approximation expression. The approximation expression corresponds to Formula (9).

$$Ta=0.1107F^{0.8} \quad (9)$$

Therefore, comparing Formulas (9) and (5), it can be found that C=0.1107 and m=0.8. In deriving Formula (9), in actual practice, the choice of creating the graph shown in FIG. 8 is arbitrary. In other words, it is not necessary to create this graph when, for example, determining the constants C and m by processing each of the values shown in Table 2 with, for example, a computer. However, even in this case, the graph may be created for the purpose of easily visually finding out the relationship between the torque coefficient F and the action Ta produced by each inside notch.

In addition to the advantages 1) to 3), the embodiment provides the following advantages.

10) In the embodiment, since the optimal radii r are specified, if each of the inside notches 37 is formed with the specified radius r thereof, it is possible to know the radius r of each inside notch which completely cancels the corresponding initial cogging torque Ti, so that, compared to each cogging torque produced in the first embodiment, each cogging torque produced by the rotor 12 can reliably be brought closer to zero.

11) Here, since the constants C and m are determined based on the actual measurement results, it is, in reality, possible to obtain values which are highly reliable.

[Third Embodiment]

A description of a third embodiment of the present invention will now be given. In the embodiment, structural parts similar to those of the first embodiment are given the same reference numerals, and descriptions thereof will either be omitted or simplified.

Figure 9:
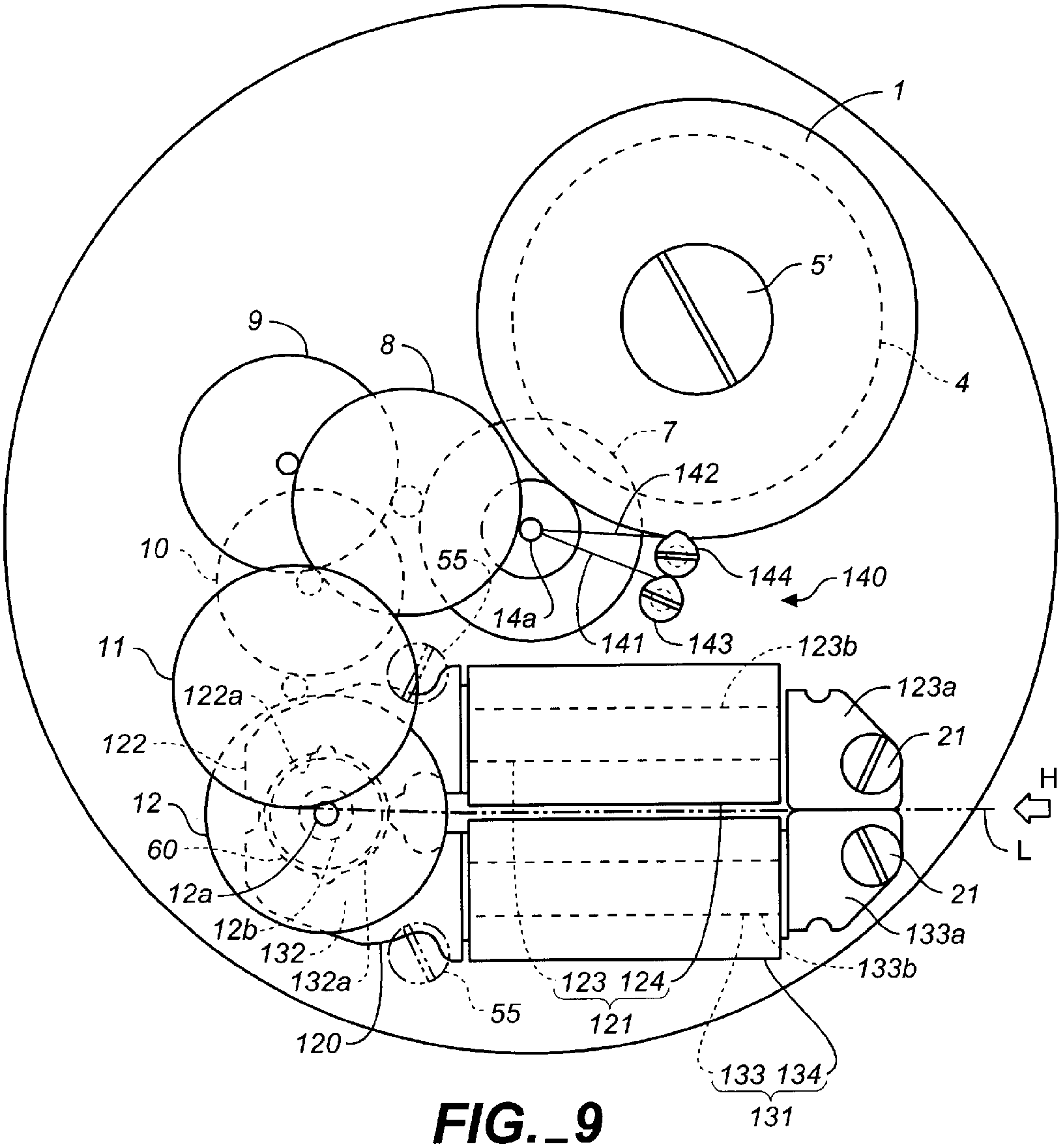
FIG. 9 is a plan view of the main portion of a third embodiment of the electronic controlling type mechanical timepiece in accordance with the present invention.
Figure 10:
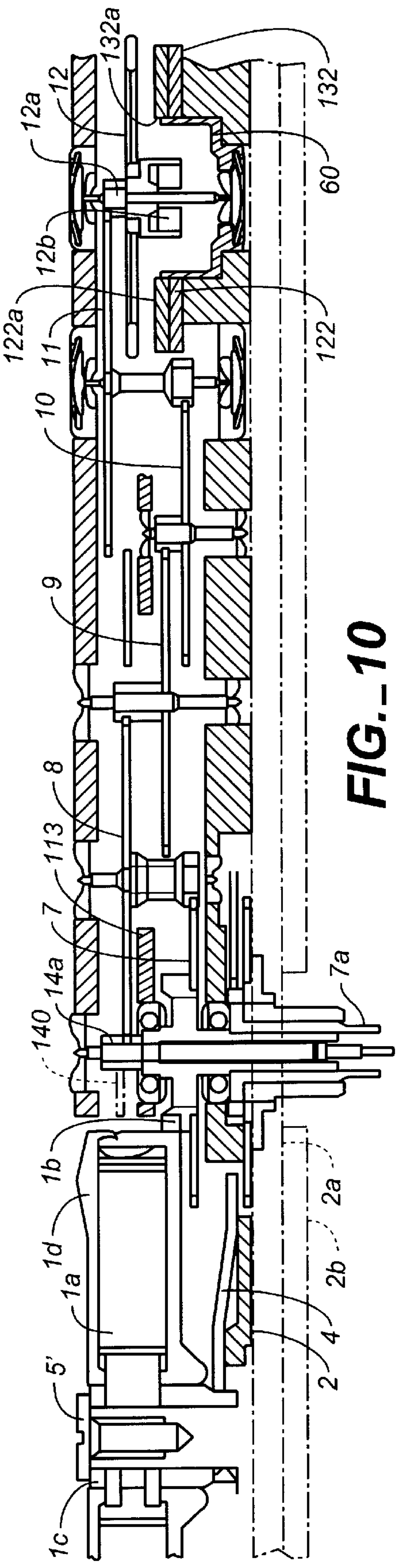
FIG. 10 is a sectional view showing the main portion of the third embodiment.
Figure 11:
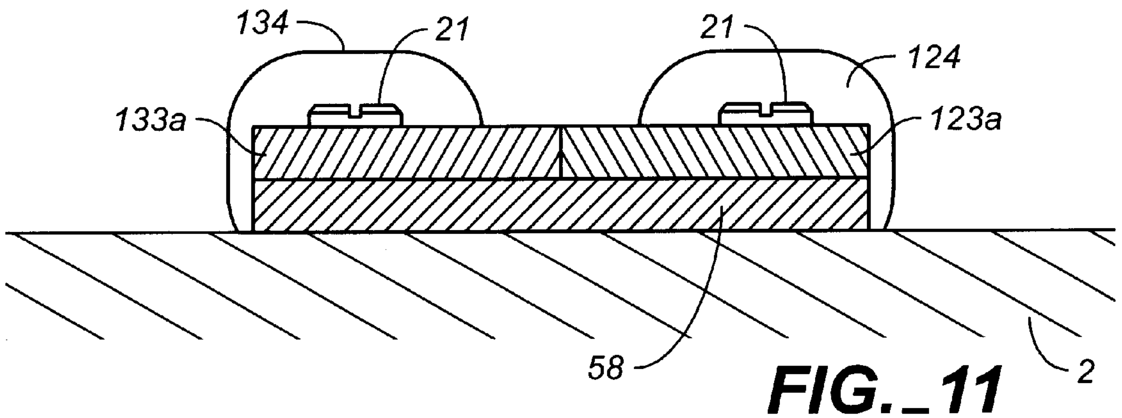
FIG. 11 is another sectional view showing the main portion of the third embodiment.

FIG. 9 is a plan view of the main portion of the electronic controlling type mechanical timepiece of the embodiment, and FIGS. 10 and 11 are sectional views thereof.

The electronic controlling type mechanical timepiece comprises a movement barrel 1 including a mainspring 1*a*, a barrel gear 1*b*, a barrel arbor 1*c*, and a barrel cover 1*d*. The outer end of the mainspring 1*a* is secured to the barrel gear 1*b*, while the inner end thereof is secured to the barrel arbor 1*c*. The barrel arbor 1*c* is cylindrical in shape, and is inserted into a supporting member of a main plate 2, with a play being defined in a vertical direction by a barrel screw 5' which is screwed. A ratchet wheel 4 is inserted into a chamfered section of the barrel arbor 1*c* so as to rotate integrally with the barrel arbor 1*c*. A calendar plate 2*a* and a disk-shaped character plate 2*b* are mounted to the main plate 2.

As in the first embodiment, rotational motion of the barrel gear 1*b* is increased by a total of 126,000 times the original speed through each of the wheels 7 to 11 making up a speed-increase wheel train. Here, the wheels 7 to 11 are disposed on different axial lines so as not to overlap coils 124 and 134 described later, and form a torque transmission path from the mainspring 1*a*.

A minute hand (not shown) for indicating time is secured to a cannon pinion 7*a* engaging the second wheel 7, while a second hand (not shown) for indicating time is secured to a center second pinion 14*a*. Therefore, in order to rotate the center second pinion 14*a* at 1 rpm when the second wheel 7 rotates at 1 rph, a rotor 12 is controlled so that it rotates at 5 rps. Here, the barrel gear 1*b* rotates at 1/7 rph.

The center second pinion 14*a* disposed away from the torque transmission path is such that backlash thereat is formed towards one side by a hand restricting device 140 disposed between the movement barrel 1 and the coil 124, thereby restricting the shaking of the hand. The hand restricting device 140 comprises a pair of linear restricting springs 141 and 142 subjected to surface treatment, such as fluorine-contained resin treatment or intermolecular bond coating, to decrease frictional loss with respect to the center second pinion; and collets 143 and 144 serving as members secured to a second wheel bridge 113, with base end sides of the restricting springs 141 and 142 being supported by the collets 143 and 144, respectively.

The electronic controlling type mechanical timepiece comprises a generator 120 including a rotor 12 and coil blocks 121 and 131. The rotor 12 comprises a rotor pinion 12*a* and a rotor magnet 12*b*.

The coil block 121 comprises the coil 124 wound upon a stator (core, magnetic core) 123, and the coil block 131 comprises the coil 134 wound upon a stator (core, magnetic core) 133. The stators 123 and 133 comprise respective core stator sections 122 and 132 disposed adjacent to the rotor 12, respective core winding sections 123*b* and 133*b* upon which the respective coils 124 and 134 are wound, and respective core magnetism conducting sections 123*a* and 133*a* connected together, with these component parts being integrally formed.

The stators 123 and 133, that is, the coils 124 and 134 are disposed parallel to each other. At the core stator section 122 side and the core stator section 132 side, a center axis of the rotor 12 is disposed on a boundary line L between the coils 124 and 134, and the core stator sections 122 and 132 are symmetrically formed on the left and right sides of the boundary line L.

Figure 12:
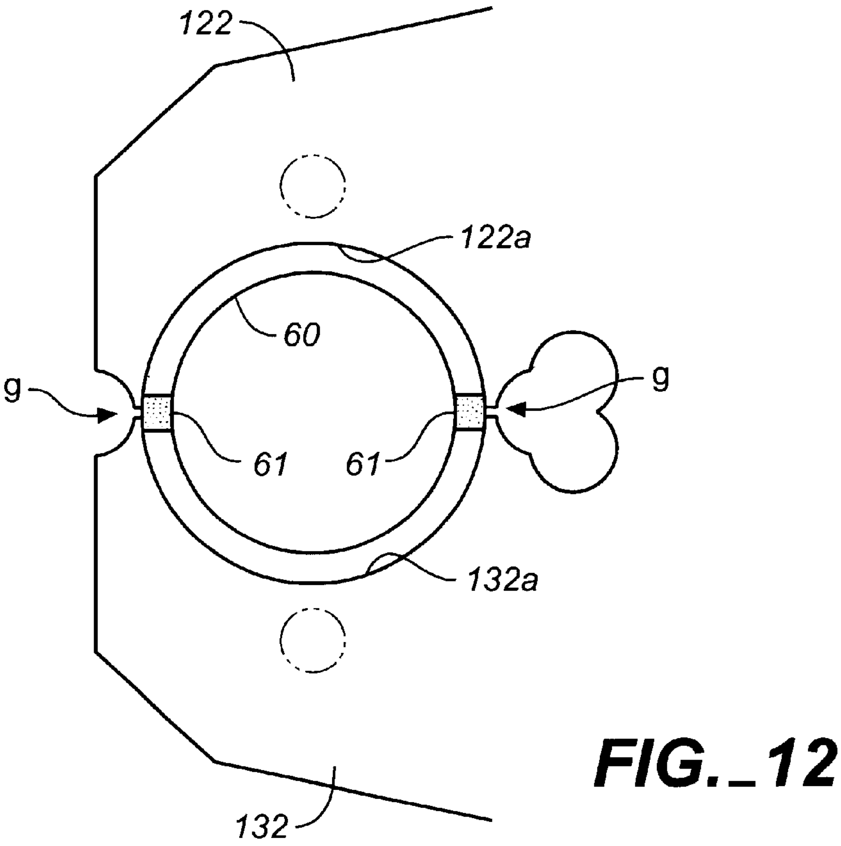
FIG. 12 is an enlarged view of an adjusting section used in the third embodiment.

As shown in FIGS. 9 and 10, a bush 60 formed of resin and formed for guiding the stators 123 and 133 is formed in stator holes 122*a* and 132*a* of the corresponding stators 123 and 133 in which the rotor 12 is disposed. As shown in FIG. 12, in the bush 60, a pair of metallic pieces 61, formed of magnetic materials, serving as adjusting sections are embedded in locations of the stators 123 and 133 intersecting a straight line connecting gaps g. The metallic pieces 61 may be iron pieces or iron pieces subjected to nickel plating, or platinum pieces. Returning to FIG. 9, positioning jigs 55, which are eccentric pins, are disposed at intermediate portions of the respective stators 123 and 133 in a longitudinal direction thereof, that is, between the core stator section 122 and the core magnetism conducting section 123*a* and between the core stator section 132 and the core magnetism conducting section 133*a*, respectively. When the positioning jigs 55 are rotated, the core stator sections 122 and 132 of the respective stators 123 and 133 can be brought into contact with the bush 60 in order to precisely and easily position them, and side surfaces of the core magnetism conducting sections 123*a* and 133*a* can reliably be brought into contact with each other.

The coils 124 and 134 have the same number of windings. Here, the same number of windings does not necessarily mean exactly the same number of windings. There may a difference in the number of windings as long as this difference is negligible compared to the total number of windings. For example, there may be a difference of the order of a few hundred turns.

As shown in FIG. 11, a side of the core magnetism conducting section 123*a* of the stator 123 and a side of the core magnetism conducting section 133*a* of the stator 133 are brought into contact with each other and connected together. Lower surfaces of the core magnetism conducting sections 123*a* and 133*a* are in contact with a yoke 58 disposed so as to extend across the core magnetism conducting sections 123*a* and 133*a*. Accordingly, at the core magnetism conducting sections 123*a* and 133*a*, two magnetism conducting paths are formed, a magnetism conducting path which passes a side surface portion of each of the core magnetism conducting sections 123*a* and 133*a*, and another magnetism conducting path which passes the lower surface of each of the core magnetism conducting sections 123*a* and 133*a* and the yoke 58. The stators 123 and 133 form an annular magnetic circuit. The coils 124 and 134 are wound in the same direction with respect to a direction from the core magnetism conducting sections 123*a* and 133*a* of the corresponding stators 123 and 133 to the corresponding core stator sections 122 and 132. At the yoke 58 side, even if the side surfaces of the core magnetism conducting sections 123*a* and 133*a* of the corresponding stators 123 and 133 are not in absolute contact with each other so that there is a very small space therebetween, all that is required is for the magnetic circuit to be adequately formed, so that, in this case, the gap can be ignored.

An end of each of the coils 124 and 134 is connected to a coil lead substrate (not shown) formed on the core magnetism conducting sections 123*a* and 133*a* of the corresponding stators 123 and 133.

In the case where the electronic controlling type mechanical timepiece having the above-described structure is used, when an external magnetic field H (FIG. 9) is applied to each of the coils 124 and 134, it is applied in the same direction with respect to the coils 124 and 134 disposed parallel to each other. Therefore, with respect to the direction of winding of each of the coils 124 and 134, the external magnetic fields H are applied in opposite directions. Therefore, since the external magnetic fields H act to cancel the electromotive voltages generated in the coils 124 and 134, the effects of electromotive voltages can be reduced.

According to the third embodiment, the following advantages are provided.

12) In the embodiment, since the metallic pieces 61, which are formed of magnetic materials, are embedded in the bush 60 disposed to guide the stators 123 and 133, a magnetic balancing adjustment between the stators 123 and 133 and the rotor 12 can be performed, making it possible to similarly provide the above-described advantages 1) and 2).

13) The second to sixth wheels 7 to 11 can be designed with greater freedom by disposing them on different axial lines, so that, by, for example, disposing the center second pinion 14*a* outside the torque transmission path in order to dispose the wheels 7 to 11 towards the rotor 12 in a roundabout manner, they can be disposed so as not to overlap the coils 124 and 134. Therefore, since the number of windings can be increased based on a corresponding increase in the size of each of the coils 124 and 134 in a corresponding thickness direction thereof, the length of each of the coils 124 and 134 in a corresponding direction of a plane, and, thus, the length of each of the magnetic paths can be decreased, thereby allowing the mainspring 1*a* to continue operating for a longer period of time as a result of decreasing iron loss.

14) Since the rotor 12 is disposed on the aforementioned boundary line L, and the stators 123 and 133 are symmetrically constructed on the left and right sides, even the magnetic paths at the core stator sections 122 and 132 can be made shorted as in the first embodiment, so that, here again, the length of each of the magnetic paths can be made shorter, making it possible to reduce iron loss.

15) Since two magnetism conducting paths are formed at the core magnetism conducting sections 123*a* and 133*a*, the magnetic resistance can be made small and be stabilized. In other words, the magnetic flux lines at the core magnetism conducting sections 123*a* and 133*a* tend to flow towards the directions of the side surfaces, and, at the side surfaces of the core magnetism conducting sections 123*a* and 133*a* which contact each other, variations in gaps tend to occur with different products, so that variations in the magnetic resistance may also occur. In contrast, if the magnetism conducting paths are constructed only through the yoke, the variations in the sizes of the gaps can be made small, but the magnetic flux lines flow less readily than those flowing towards the directions of the side surfaces, so that the magnetic resistance cannot be made very small.

In contrast, if two magnetism conducting paths are formed as in the embodiment, the magnetic resistance can be made small and stable. By making the magnetic resistance stable, the cogging torque is made stable, so that, by providing the metallic pieces 61 in correspondence with the size of the torque, the cogging torque can reliably be made small. In addition, the electromotive voltages can be stabilized, thereby making it possible to stabilize the electrical power generation and the braking operation. Further, magnetic flux leakage can be decreased, and eddy losses at the metallic parts can be reduced.

16) Since the positioning jigs 55 are disposed between the core magnetism. conducting sections 123*a* and 133*a* and the corresponding core stator sections 122 and 132, it is possible to align the core stator sections 122 and 132 and adjust the state of contact between the core magnetism conducting sections 123*a* and 133*a* using one positioning jig 55 for each of the stators 123 and 133. This reduces the number of positioning jigs 55 used, making it possible to simplify the structure and to reduce costs.

17) Since magnetic noise caused by the external magnetic fields H can be made small, it is not necessary to provide a magnetism resistant plate on a movement part, such as the character plate 2*b* of the electronic controlling type mechanical timepiece, or to use materials which resist magnetism on exterior component parts. Therefore, costs can be reduced, and, since a magnetism resistant plate or the like is not required, the movement can be made correspondingly small and thin, which, in turn, allows designing with greater freedom because the disposition of each of the component parts is not restricted by the exterior component parts. Thus, it is possible to provide an electronic controlling tyke mechanical timepiece which, for example, can be more elaborately designed and can be produced with high efficiency.

18) Disposing the center second pinion 14*a* outside the torque transmission path makes it unnecessary to provide, for example, a torque transmission gear overlapping the movement barrel 1 in the center second pinion 14*a*, so that the width of the mainspring 1*a* can correspondingly be made large, making it possible to increase the length of time the mainspring 1*a* continues operating while maintaining the thickness of the entire timepiece.

[Fourth Embodiment]

A description of a fourth embodiment of the present invention will now be given.

Figure 14:
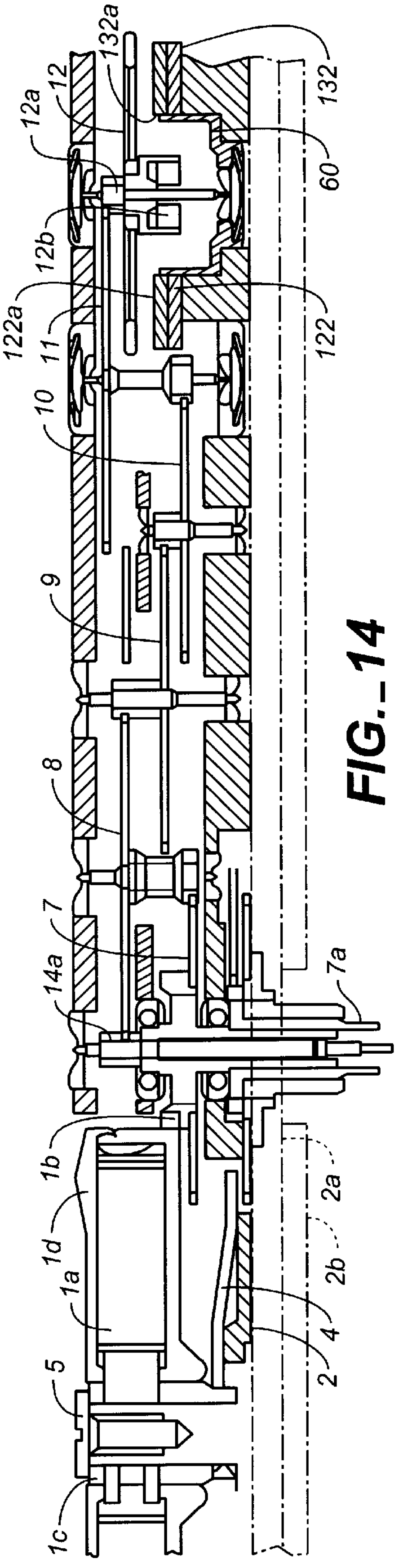
FIG. 14 is a sectional view of the main portion of FIG. 13.
Figure 13:
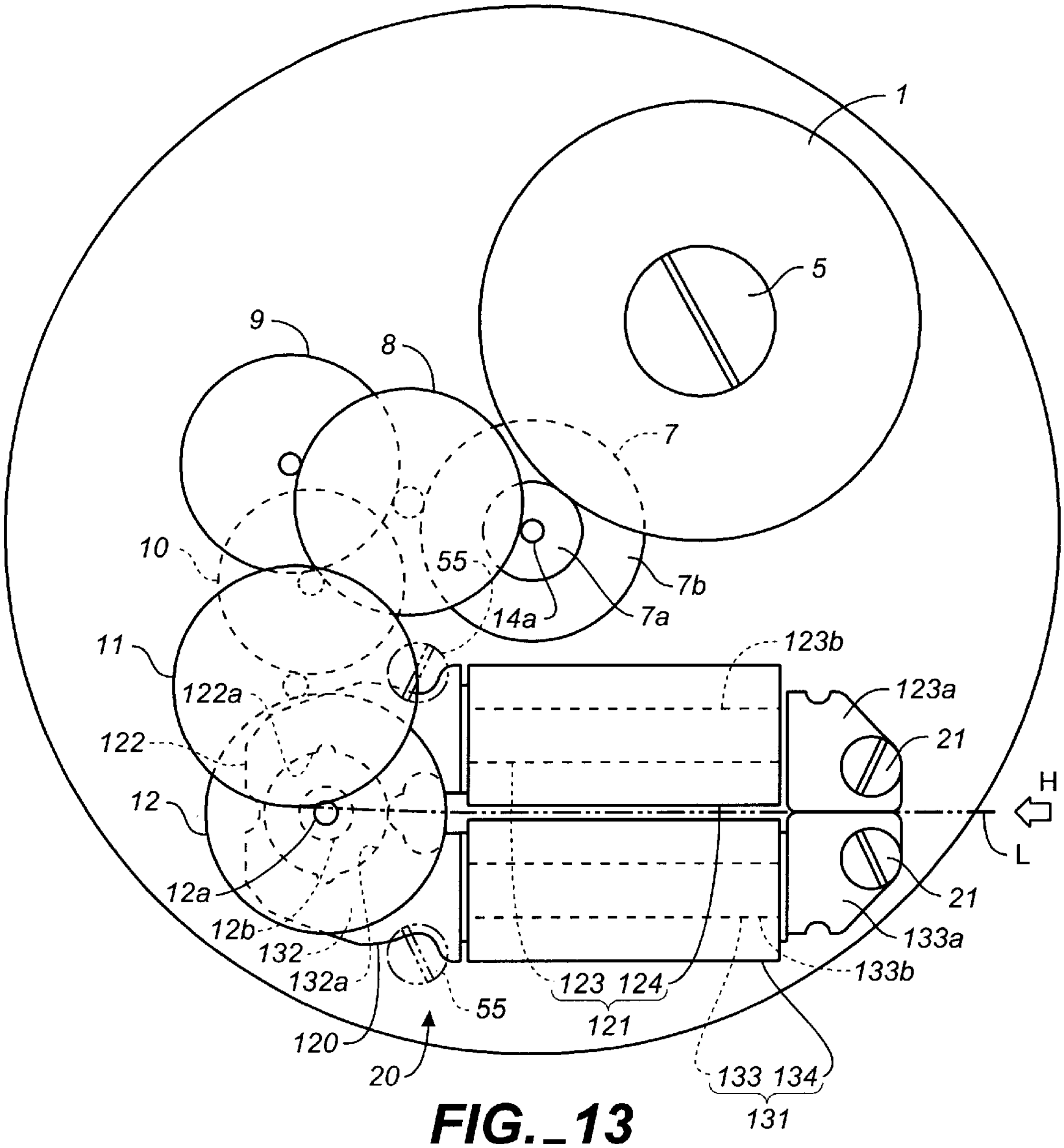
FIG. 13 is a plan view of a fourth embodiment of the electronic controlling type mechanical timepiece in accordance with the present invention.

As shown in FIGS. 13 and 14, the structure of the electronic controlling type mechanical timepiece of the embodiment is similar to that of the electronic controlling type mechanical timepiece of the third embodiment. Therefore, structural parts similar to those of the third embodiment are given the same reference numerals, and descriptions thereof will be either omitted or simplified.

In the embodiment, a rotor 12 (rotor magnet 12*b*) comprises a rare earth magnet in which samarium-cobalt material is used as a raw material, has a maximum energy product of 32 megagauss oersteds (MGOe) (=254.7 KJ/$m^3$ in international system of units), and has the shape of a disk with a diameter of 1.35 mm and a thickness of 0.4 mm.

Stators 123 and 133 are each formed of a permalloy material with a maximum permeability of 400000 and a saturation magnetic flux density of 0.74 T.

Figure 15:
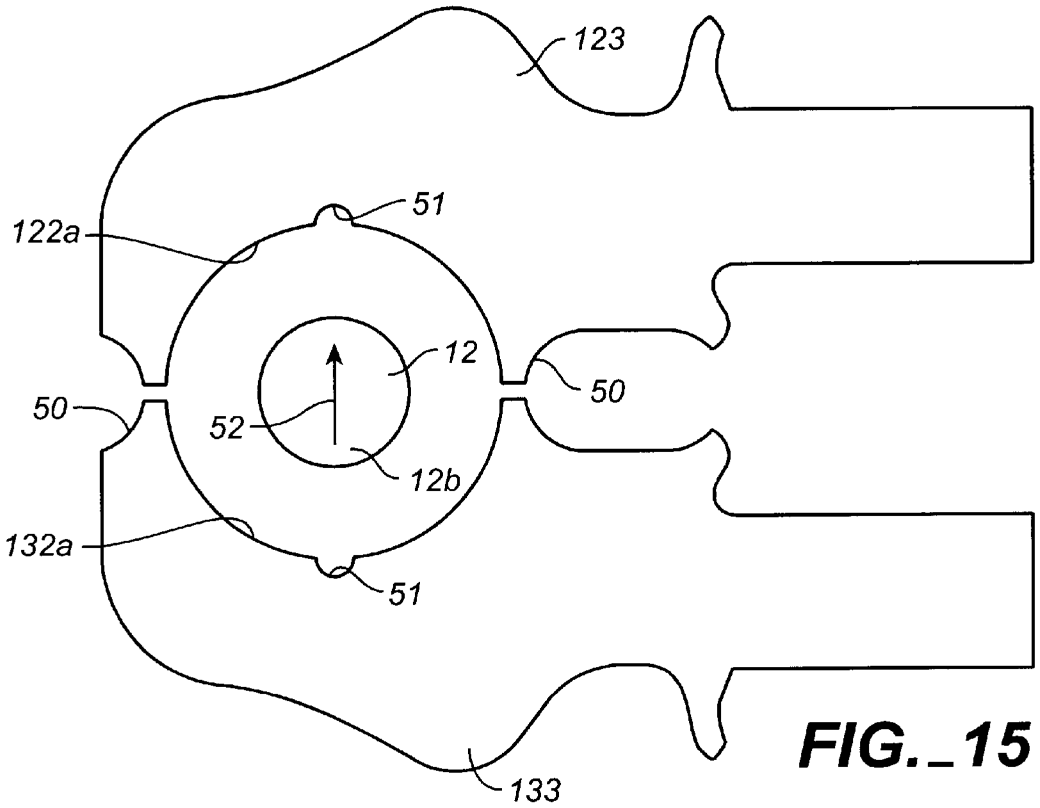
FIG. 15 is a schematic view showing the main portion of a generator serving as an electromagnetic rotation device.

As shown in FIG. 15, outside notches 50 and inside notches 51 are formed in stator holes (rotor holes) 122*a* and 132*a* of the corresponding stators 123 and 133. The outside notches 50 are formed in portions of the stators 123 and 133 opposing each other.

The inside notches 51 are formed as adjusting sections in the present invention in correspondence with a direction of a magnetic pole (indicated by arrow 52 in FIG. 15) of the rotor 12 when the cogging torque generated at the rotor 12 is statically stable in a state where no inside notches 51 are formed. In other words, they are formed on extension lines of the arrow 52. In the embodiment, a total of two inside notches 51 are formed in a direction perpendicular to a line segment connecting the outside notches 51, one of which is formed in the inner peripheral surface of the rotor hole 122*a* and the other of which is formed in the inner peripheral surface of the rotor hole 132*a*.

Figure 16:
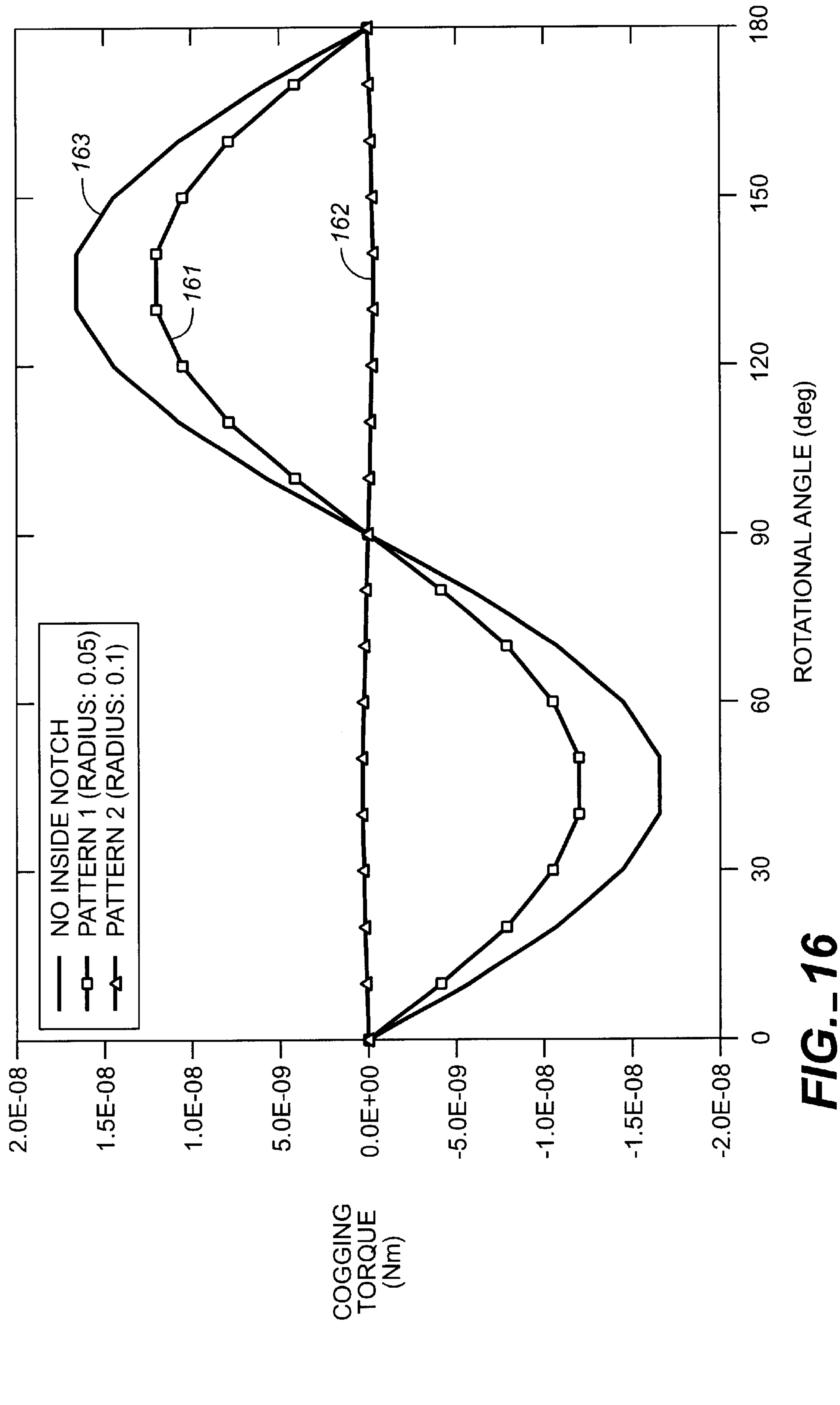
FIG. 16 illustrates a graph showing the relationship between the cogging torque and the angle of rotation of a rotor in the fourth embodiment of the present invention.
Figure 17:
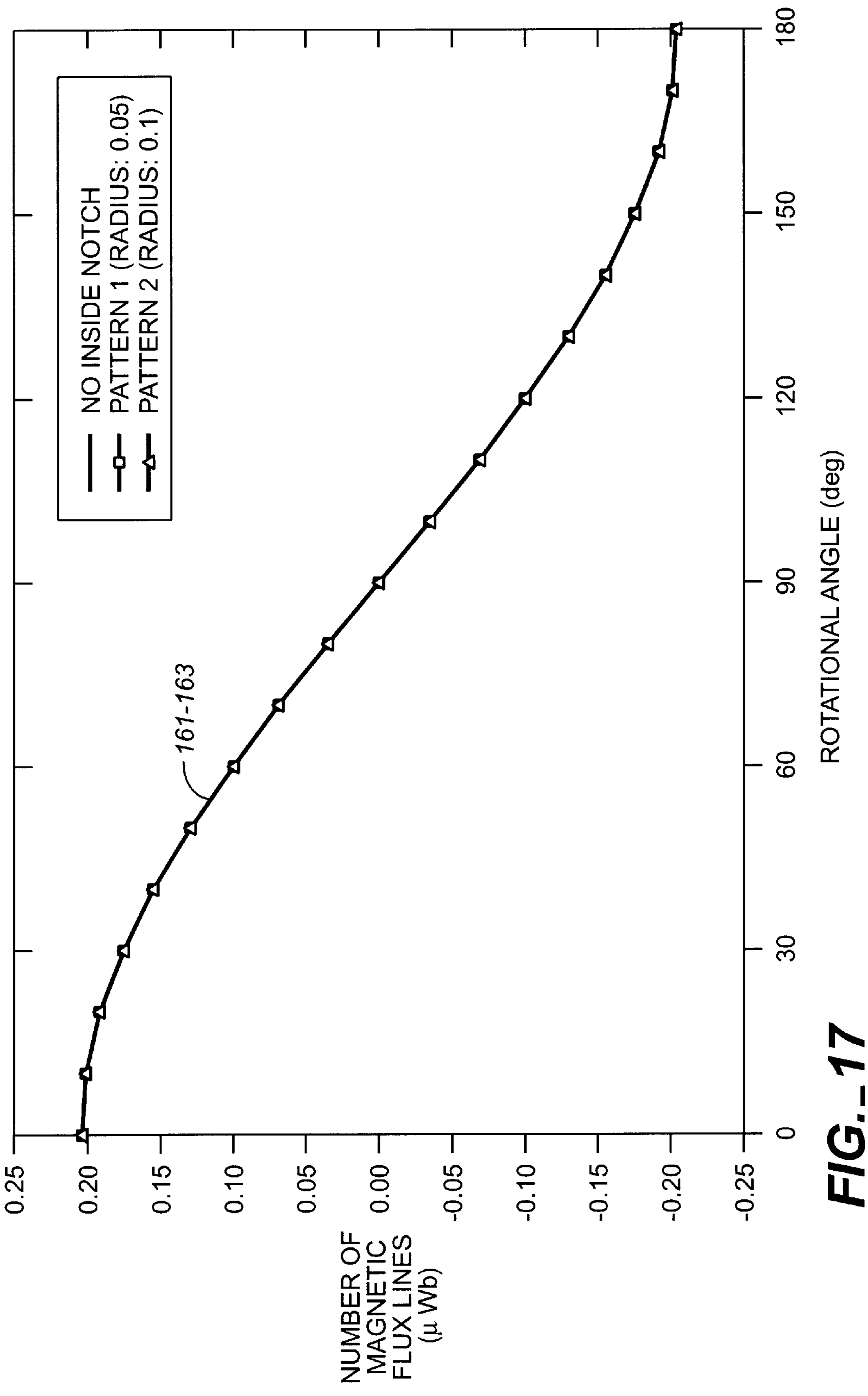
FIG. 17 illustrates a graph showing the relationship between the number of magnetic flux lines and the angle of rotation of the rotor in the fourth embodiment of the present invention.

Results of a two-dimensional magnetic field analysis in the embodiment are shown in FIGS. 16 and 17. As is clear from the graph of FIG. 16, the cogging torque of each of the pieces of data (patterns 1 and 2) 161 and 162 is less than that of data 163 where no inside notches are formed. In particular, in the pattern 2, the cogging torque is greatly reduced to approximately equal to or less than 1/10 of the cogging torque produced when no inside notches are formed. Although not shown, with regard to the actual measured values, the cogging torque can be reduced to equal to or less than ½ of the cogging torque when no inside notches are formed.

Comparing the patterns 1 and 2, only the sizes of the inside notches 51 are different. In the pattern 1 data, the radius of each inside notch 51 is 0.05 mm, while, in the pattern 2 data, the radius of each inside notch 51 is 0.1 mm.

As is clear from the graph in FIG. 17, the numbers of magnetic flux linkages in the coils in the case where there are no inside notches 51 and in the cases where there are inside notches 51 (patterns 1 and 2) are the same.

In addition to the above-described advantages provided by each of the previous embodiments, the embodiment provides the following advantages.

19) Since the inside notches 51 are provided in correspondence with the direction of a magnetic pole of the rotor 12 when the rotor 12 is at a statically stable position, the cogging torque acting on the rotor 12 can be reduced. Accordingly, since the rotor 12 is such as to rotate with a very small torque, it can be started more readily, can move smoothly while it is rotating, does not easily stop due to an external disturbance, and is made more reliable. In particular, as in the pattern 2, by suitably adjusting the sizes of the inside notches 51, the cogging torque can be greatly reduced to approximately equal to or less than 1/10 of the cogging torque produced when no inside notches are formed. Therefore, since only a small torque is exerted to the rotor 12 from the mainspring, the speed-increase ratio of the wheel train can be increased, making it possible to increase the length of time the mainspring continues operating. In addition, since the rotor 12 can move smoothly while it is rotating, a hand can be subjected to a sweeping movement, and a smooth hand movement can be realized without any uneven movement.

20) The number of magnetic flux linkages that greatly affect the electrical power generation capability can be made the same as that in a conventional timepiece, and the cogging torque alone can be reduced, making it possible to increase the rotational speed of the rotor 12, and generate an amount of electromotive voltage which is larger than that in a conventional timepiece.

Since the generator can be made more efficient than conventional generators, mechanical energy sources, such as the rotor 12, the oscillating weight, or the mainspring 1*a*, can be made small and thin, thereby making it possible to reduce costs.

21) The inside notches 51 can be easily formed by cutting away portions of the rotor hole sections 122*a* and 132*a* by, for example, a pressing operation, so that the manufacturing process can be simplified.

Moreover, since the inside notches 51 only need to be formed in correspondence with the statically stable location prior to the formation of the inside notches 51, the locations can be easily specially fixed, so that, here again, the manufacturing process can be simplified.

[Fifth Embodiment]

A description of a fifth embodiment of the present invention will be given with reference to FIG. 18.

Figure 18:
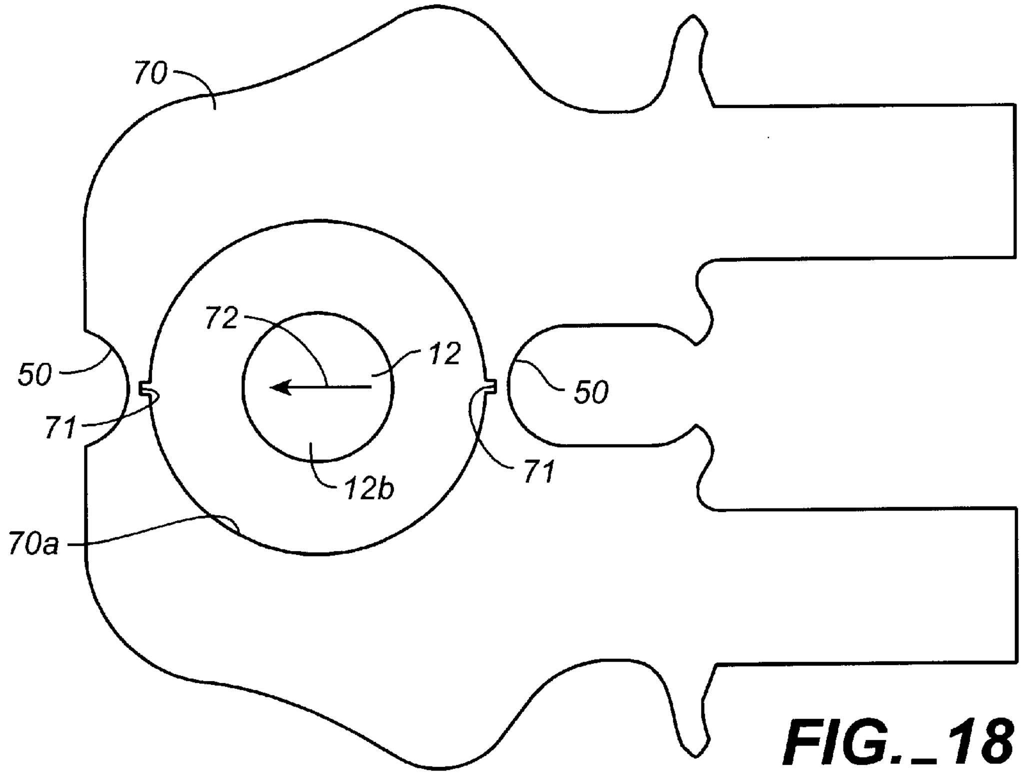
FIG. 18 is a schematic view showing the main portion of a generator serving as an electromagnetic rotation device in a fifth embodiment of the present invention.

In contrast to the fourth embodiment in which the rotor hole portions are formed in the two stators 123 and 133, respectively, in the fifth embodiment, a stator hole (rotor hole) 70*a* is formed in one stator 70 whose outside notches 50 are continuously formed as shown in FIG. 18.

In the embodiment, inside notches 71 serving as adjusting sections are formed in the inner peripheral surface of the rotor hole section 70*a* along a direction of a magnetic pole (indicated by arrow 72 in FIG. 18) of the rotor 12 when the cogging torque generated by the rotor 12 (rotor magnet 12b) is statically stable. In the embodiment, a total of two inside notches 71 are formed in a direction along a line connecting outside notches 50, each inside notch 71 being formed in the inner peripheral surface of the rotor hole section 70*a*.

Even in a state in which the inside notches 71 are formed, the continuity of the portion of the stator 70 where the rotor hole section 70*a* is formed is maintained.

Figure 19:
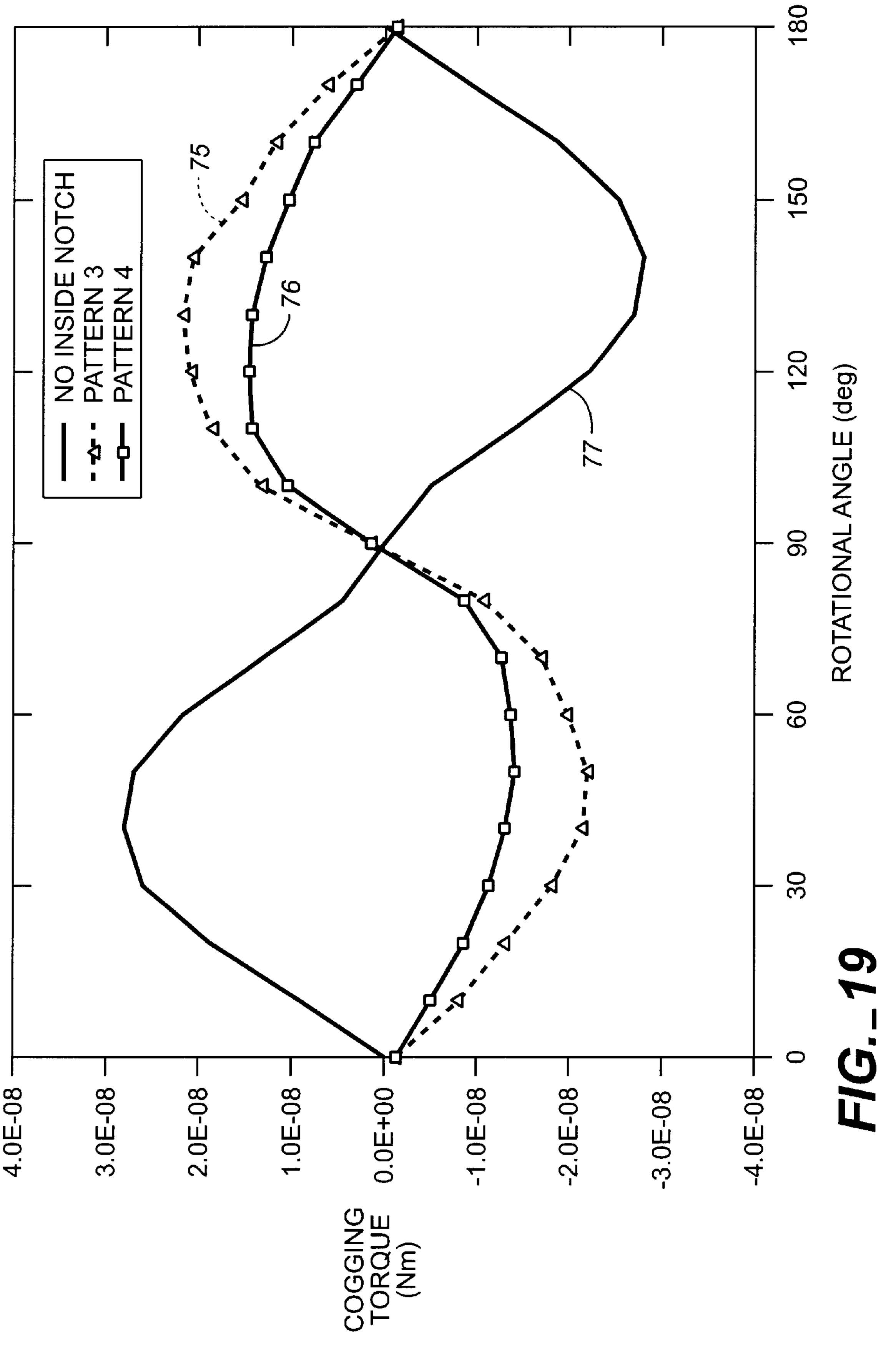
FIG. 19 illustrates a graph showing the relationship between the cogging torque and the angle of rotation of a rotor in the fifth embodiment.

Results of a two-dimensional magnetic field analysis in the embodiment are shown in the graphs shown in FIGS. 19 and 20. As is clear from the graph shown in FIG. 19, the cogging torque of each of the pieces of data (patterns 3 and 4) 75 and 76 is reduced to approximately equal to or less than ¾ to ½ of the cogging torque of data 77 when no inside notches are formed. In comparing the patterns 3 and 4, only the sizes and the forms of the inside notches 71 are different. As shown in FIG. 18, in the pattern 3 data, each inside notch 71 is a square cutout with one side measuring approximately 0.05 mm, whereas, in the pattern 4 data, each inside notch 71 is a triangular cutout with an area approximately half that of each cutout used in the pattern 3 data (the bottom side and the height being approximately 0.05 mm).

Figure 20:
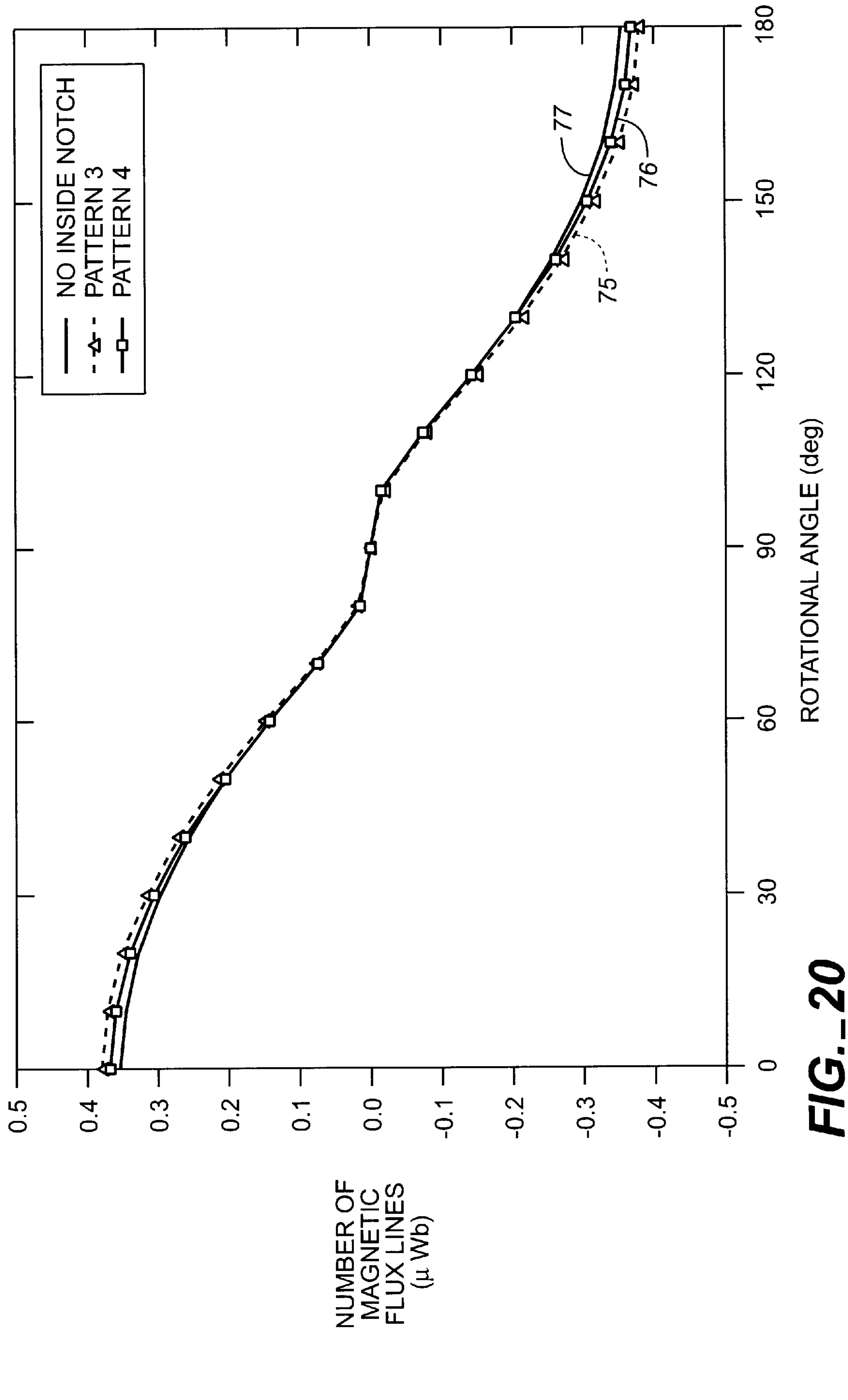
FIG. 20 illustrates a graph showing the relationship between the number of magnetic flux lines and the angle of rotation of the rotor in the fifth embodiment.

As is clear from the graph shown in FIG. 20, the number of magnetic flux linkages in the coils in the case where there are no inside notches and in the patterns 3 and 4 are substantially the same.

Even in this embodiment, the advantages provided by the fourth embodiment can be provided.

22) In addition to these advantages, the strength of the rotor hole section 70*a* and the precision with which it is formed can be increased because the portions of the integrally formed stator 70 where the outside notches 50 are formed are continuously formed.

[Sixth Embodiment]

A description of a sixth embodiment of the present invention will be given with reference to FIG. 21.

In the embodiment, the present invention is applied to a generator 180 that is an electromagnetic rotary device.

More specifically, the generator 180 is constructed so as to include a stator 181 having a stator hole (rotor hole section) 181*a* formed therein and forming a magnetic path, a core 182 upon which a coil (not shown) is wound, and a rotor 18. made up of a permanent magnet.

The stator 181 has outside notches 184 and first inside notches 185 and second inside notches 186. In the embodiment the stator 181 has an integral structure which is not divided at the rotor hole section 181*a*.

In the embodiment, the rotor 183 comprises a rare earth magnet formed of a samarium-cobalt material used as a raw material, has a maximum energy prod equal to 32 megagauss oersteds (MGOe) (=254.7 KJ/$m^3$ in international system units), and has the shape of a disk with a diameter of 1.1 mm and a thickness of 0.4 mm.

The stator 181 is formed of a permalloy material with a maximum permeability of 400000 and a saturation magnetic flux density of 0.74 T. The core 182 up on which the coil is wound is also formed of a permalloy material with a maximum permeability of 50000 and a saturation magnetic flux density of 1.5 T.

The second inside notches 186 serving as adjusting sections are formed in the inner peripheral surface of the rotor hole section 181*a* along a direction of a magnetic pole (indicated by arrow 187 in FIG. 21) of the rotor 183 when the cogging torque generated at the rotor 183 is statically stable with no inside notches 186 being formed, that is, with only the outside notches 184 and the first inside notches 185 being formed. In the embodiment, a total of two inside notches 186 are each formed in the inner peripheral surface of the rotor hole section 181*a* in a direction perpendicular to a line segment connecting the first inside notches 185.

Figure 22:
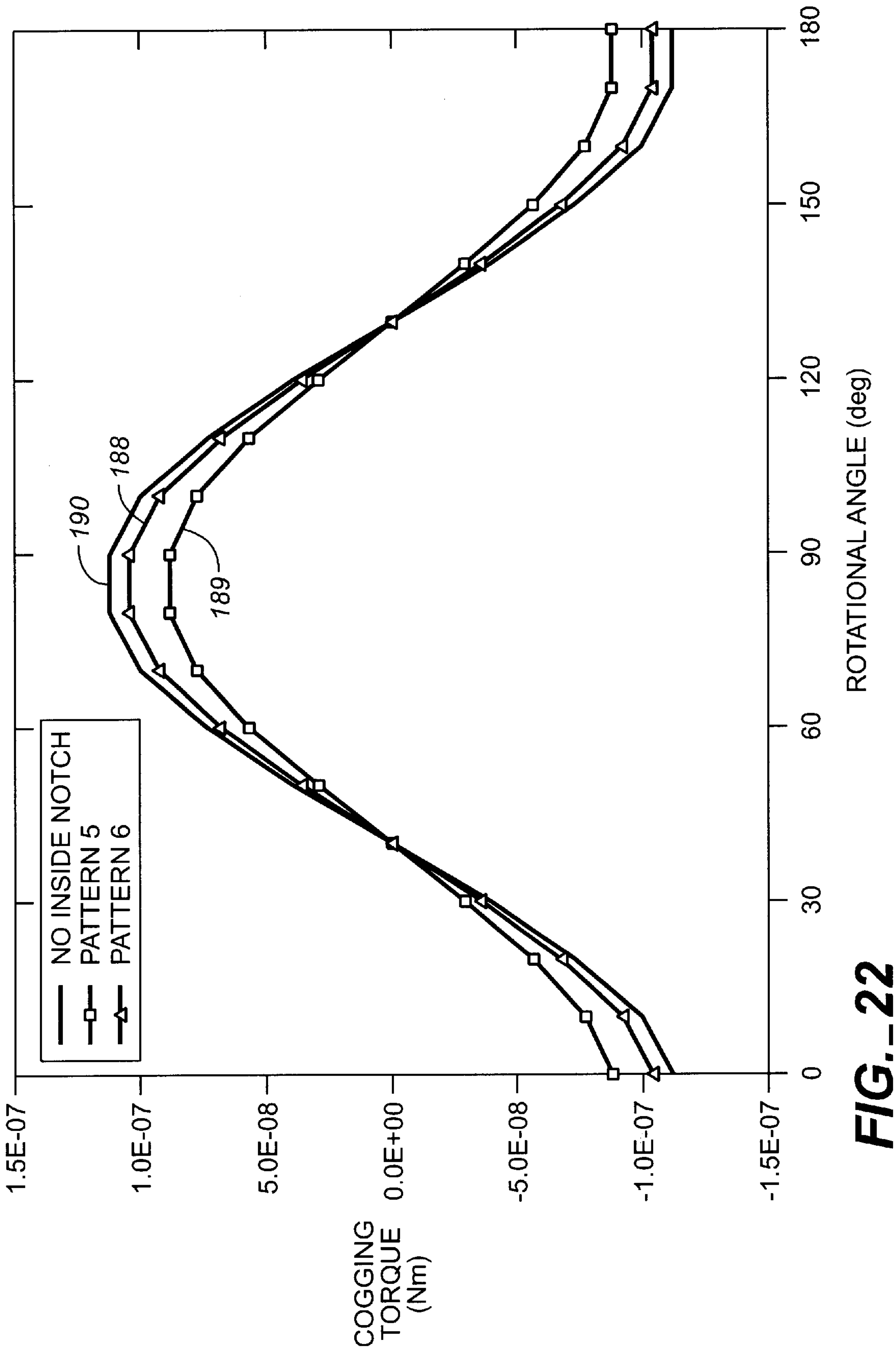
FIG. 22 illustrates a graph showing the relationship between the cogging torque and the angle of rotation in the sixth embodiment.

Results of a two-dimensional magnetic field analysis in the embodiment are shown in the graph shown in FIG. 22. As is clear from the graph shown in FIG. 22, the cogging torque of each of the pieces of data (patterns 5 and 6) 188 and 189 in the sixth embodiment is less than that of data 190 where no second inside notches 86 are formed. In the patterns 5 and 6, only the sizes of the inside notches 186 differ. In the pattern 5, the radius of each inside notch 186 is 0.05 mm, whereas, in the pattern 6, the radius of each inside notch 186 is 0.1 mm.

The portions where the cogging torques become maximum when there are no inside notches 186 and when the inside notches 186 of different sizes are formed, that is, as is clear from the graph of FIG. 22, the maximum cogging torques at the statically stable location when no inside notches 186 are formed and when the patterns 5 and 6 are used are substantially the same.

In addition to the advantages of the above-described previous embodiments, this embodiment provides the following advantage.

23) Since, in the generator 180, the cogging torque of the rotor 183 can be decreased, it is possible to increase the rotational efficiency and save electrical power.

[Seventh Embodiment]

A description of a seventh embodiment of the present invention will be given with reference to FIG. 23.

Inside notches 51 used in this embodiment are formed at locations which are different from the locations where the inside notches in the electromagnetic rotary device (generator) of the fourth embodiment are formed.

Figure 23:
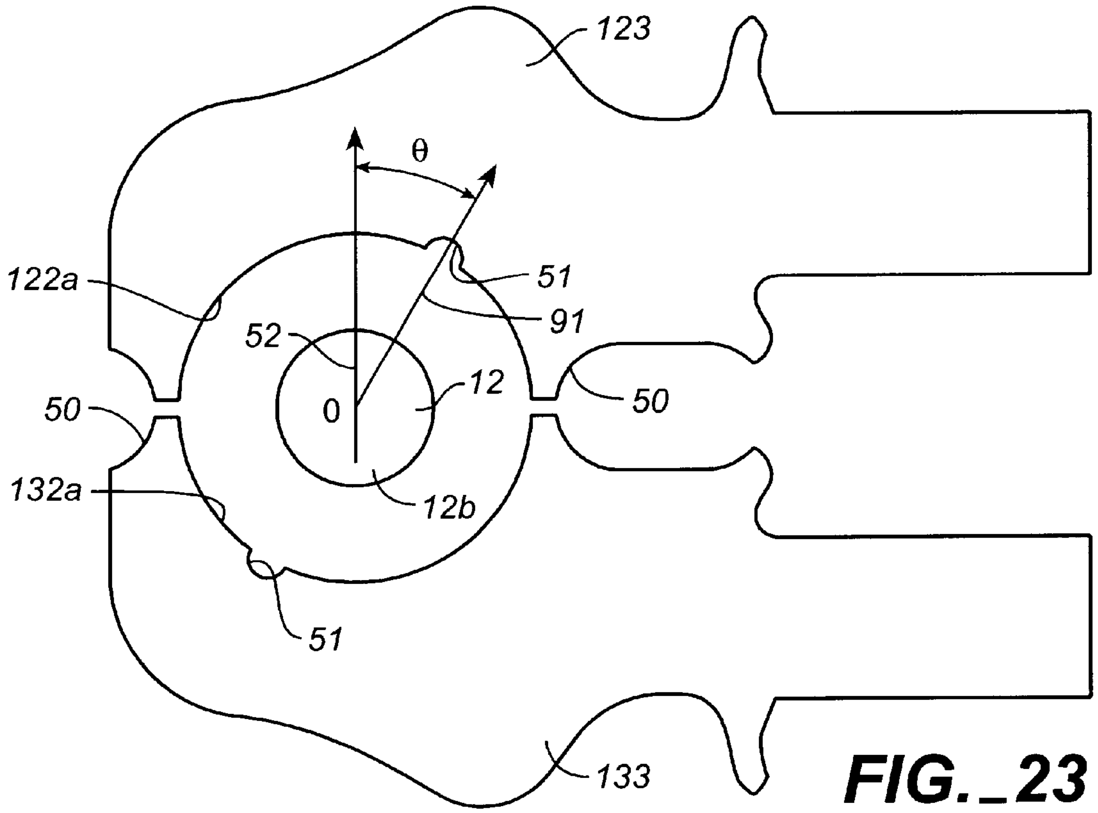
FIG. 23 is a schematic view showing the main portion of a generator serving an electromagnetic rotation device in a seventh embodiment.
Figure 24:
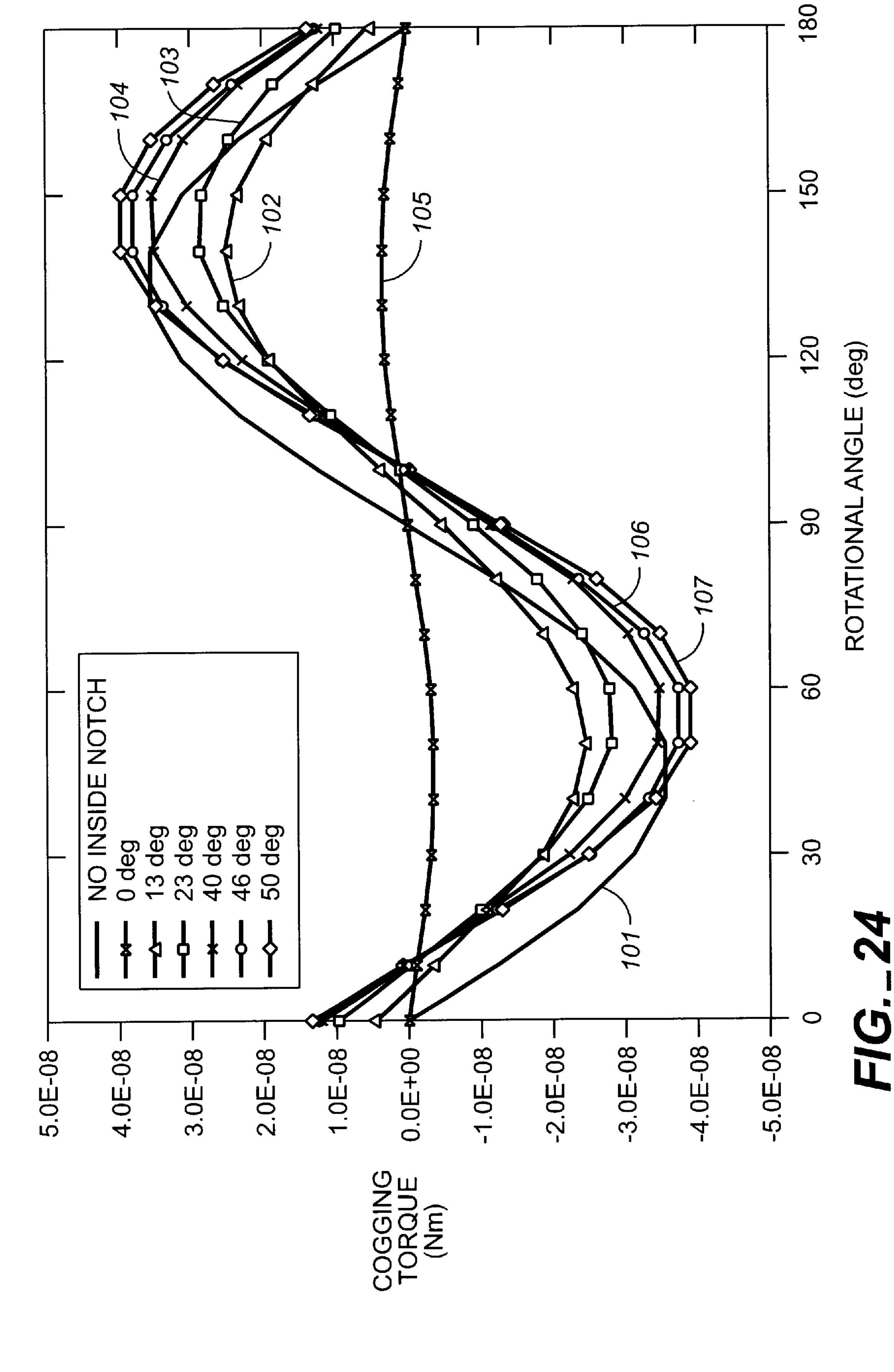
FIG. 24 illustrates a graph showing the relationship between the cogging torque and the angle of rotation of a rotor in the seventh embodiment.

More specifically, as shown in FIG. 23, the inside notches 51 used in the embodiment are formed in the inside peripheral surfaces of stator holes (rotor hole sections) 122*a* and 132*a* in a direction of rotation by an angle θ (arrow 91), with a center point O of a rotor 12 serving as a reference point, from a direction of a magnetic pole (indicated by arrow 52 in FIG. 23) of the rotor 12 when the cogging torque generated at the rotor 12 is statically stable with no inside notches 51 being formed.

Results of a two-dimensional magnetic field analysis when the angle θ is changed in the embodiment are shown in the graphs shown in FIGS. 24 to 27. As is clear from the graph shown in FIG. 24, when the angle θ is greater than 40 degrees (such as in data 106 when θ=46 degrees or in data 107 when θ=50 degrees), the maximum cogging torque becomes larger than that in data 101 where no inside notches are formed, whereas when θ is in a range of 40 degrees from the direction of the magnetic pole (θ=0 degrees) (such as in data 102 when θ=13 degrees, data 103 when θ=23 degrees, data 104 when θ=40 degrees, or data 105 when θ=0 degrees), the cogging torque can be made less than the cogging torque when no inside notches are formed. In particular, when θ is equal to or less than 30 degrees (as in data 102, 103, and 105), the cogging torque can be made considerably less than the cogging torque of the data 101 where no inside notches are formed.

Figure 26:
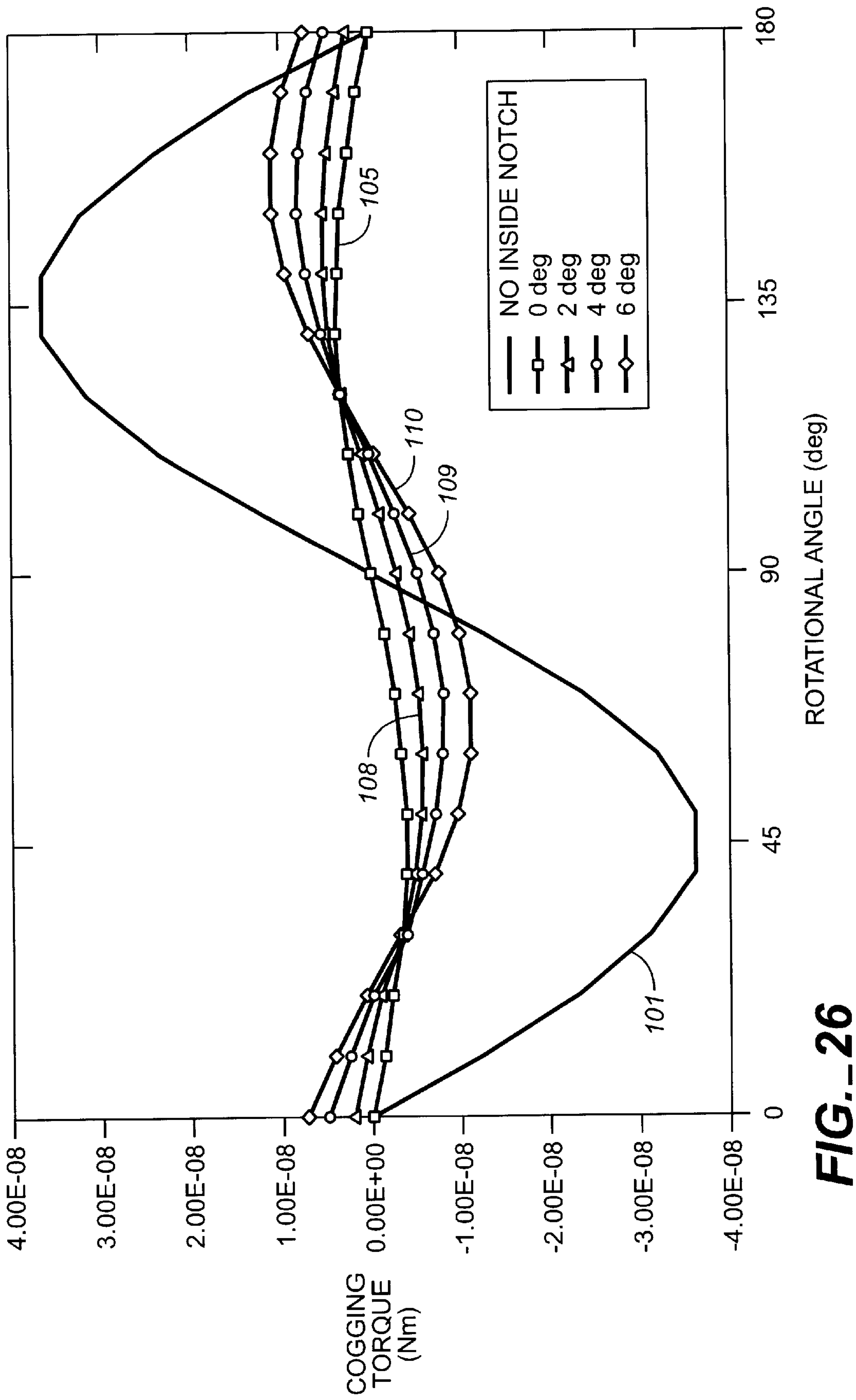
FIG. 26 illustrates a graph showing the relationship between the cogging torque and the angle of rotation of the rotor in the seventh embodiment.

As shown in the graph of FIG. 26, the smaller the θ, such as when it is in a range equal to or less than 6 degrees (such as in the data 105 when θ=0 degrees, data 108 when θ=2 degrees, data 109 when θ=4 degrees, or data 110 when θ=6 degrees), the cogging torque can be reduced even more.

The peak cogging torque value for each angle (data 105, and 108 to 110) is shown in Table 3 below.

TABLE 3

| Notch location | Cogging torque peak value (Nm) | Reduction effect (peak value ratio) |
|---|---|---|
| No inside notches | $2.89 \times 10^{-8}$ | 1.000 |
| 0 degrees | $2.97 \times 10^{-9}$ | 0.103 (approx. 1/10) |
| 2 degrees | $4.28 \times 10^{-9}$ | 0.148 (approx. 1/7) |
| 4 degrees | $6.37 \times 10^{-9}$ | 0.220 (approx. 1/5) |
| 6 degrees | $8.76 \times 10^{-9}$ | 0.303 (approx. 1/3) |

Accordingly, when, in particular, the angle θ of each inside notch is 4 degrees or less, the cogging torque peak value can be reduced to a value of the order of approximately ⅕ of the cogging torque peak value produced when no inside notches are formed, so that this is highly effective in electronic controlling type timepieces where smaller cogging torques are preferred.

Figure 25:
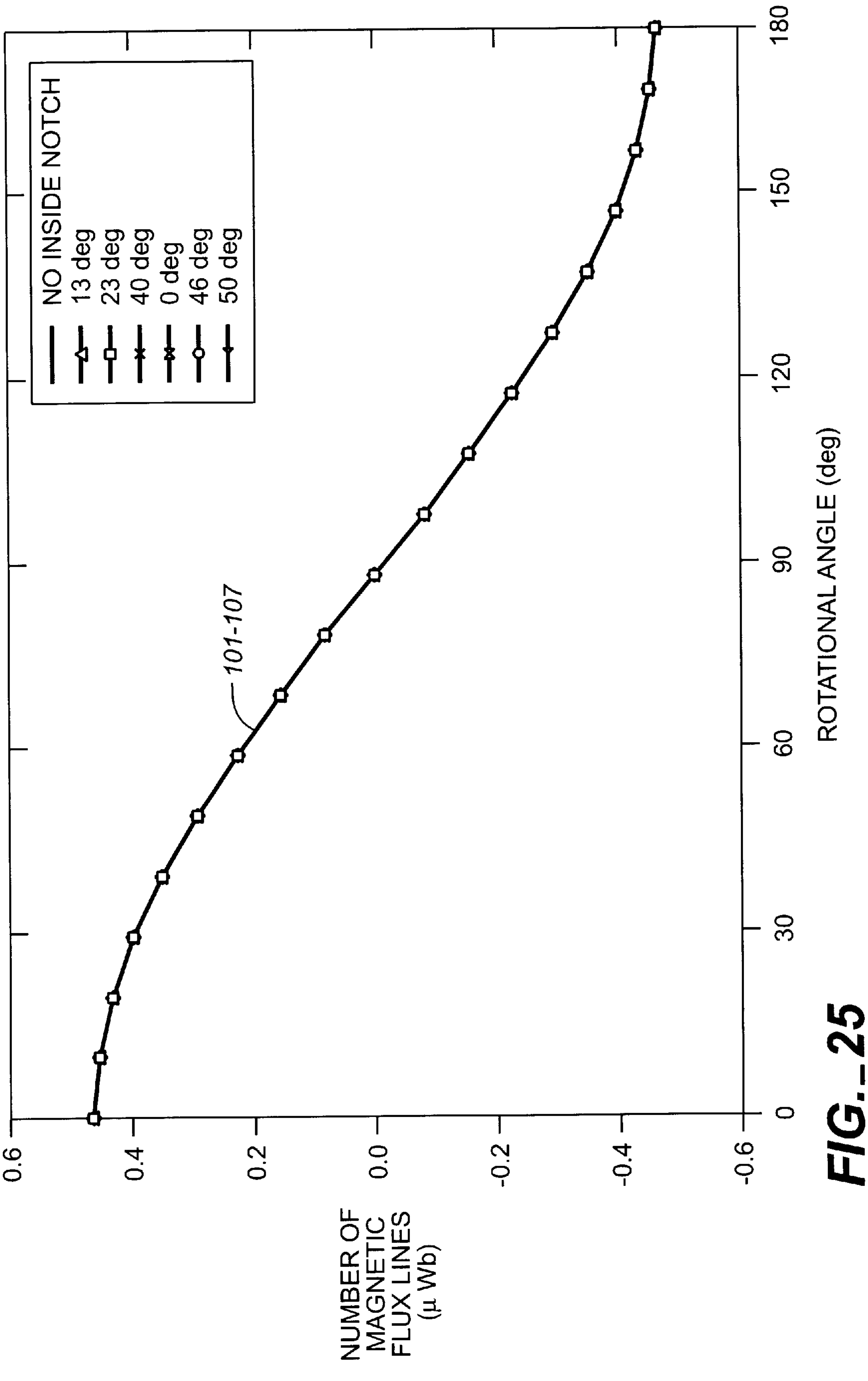
FIG. 25 illustrates a graph showing the relationship between the number of magnetic flux lines and the angle of rotation of the rotor in the seventh embodiment.
Figure 27:
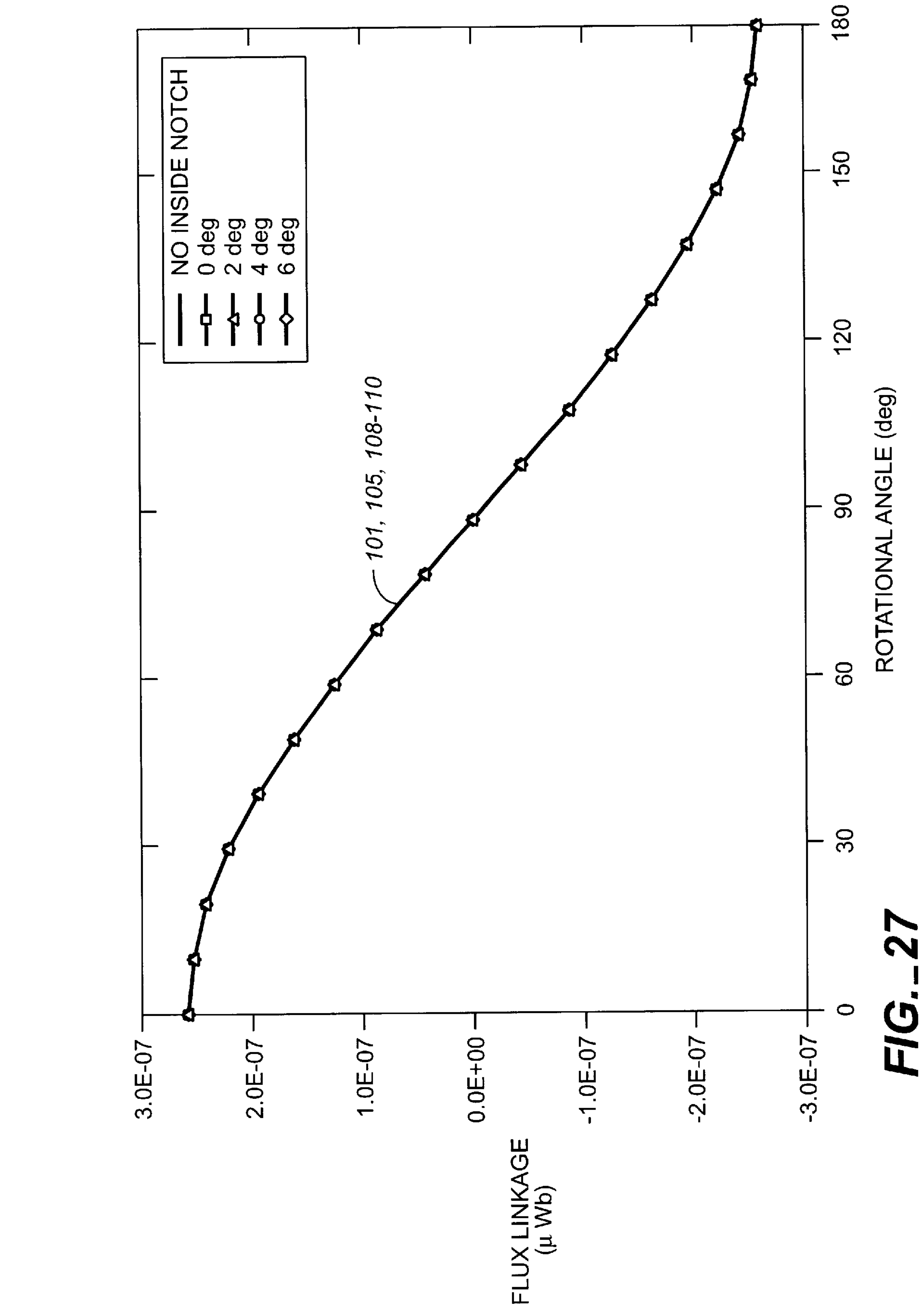
FIG. 27 illustrates a graph showing the relationship between the number of magnetic flux lines and the angle of rotation of the rotor in the seventh embodiment.

As is clear from the graphs shown in FIGS. 25 and 27, the number of magnetic flux linkages in the coils is not affected by θ, so that it does decrease at all.

The embodiment provides the advantages provided by each of the previously described embodiments.

The present invention is not limited to the above-described embodiments, so that other structures may be used as long as the object of the present invention is achieved. Modifications such as those described below are included in the present invention.

For example, although, in the embodiments 1 and 4 to 7, the inside notches 37, 51, 71, and 186 are formed as adjusting sections in the present invention, protrusions protruding towards the center of the corresponding stator holes 35 and 36 may be formed instead of the inside notches in order to perform a magnetic balancing adjustment between the stators 31 and 32 and their corresponding rotors 12, whereby the cogging torques are reduced. The protrusions are formed in a direction at right angles to the locations of the inside notches, that is, they are formed in a direction perpendicular to the directions of the corresponding magnetic poles when the corresponding rotors are statically stable. For example, the shapes of these protrusions and inside notches when viewed in a plane are not limited to semicircular shapes, so that they may have semi-elliptical shapes, trapezoidal shapes, triangular shapes, or any other shapes.

Although, in the third embodiment, the metallic pieces 61 formed of magnetic materials and serving as adjusting sections are formed at the bush 60, surface treatment using a magnetic material such as nickel may be performed. Considering, for example, the material of the bush 60, the magnetic material may be arbitrarily provided.

In addition to providing the metallic piece 61 in the bush 60 or performing surface treatment, as shown by the alternate long and two short dashed lines in FIG. 12, in the region near the stator holes 122*a* and 132*a* formed in the corresponding stators 123 and 133, a magnetic member may be interposed in a location intersecting at 90 degrees to a straight line connecting the gaps g, or this portion alone may be subjected to surface treatment using a magnetic material so that a thick film is formed on this portion, or a through hole may be simply formed in this portion in order to reduce the cogging torque by making this portion magnetically unstable. When a through hole is formed, a positioning pin formed of a nonmagnetic material is inserted into the through hole in order to make combined use the positioning members of the stators 123 and 133 and the adjusting sections used in the present invention at the positioning pin insertion through hole.

In short, any embodiment in which an adjusting section used for a magnetic balancing adjustment is provided near a stator hole is included in the present invention, and the form of the adjusting section may be arbitrarily selected when carrying out the invention.

Figure 21:
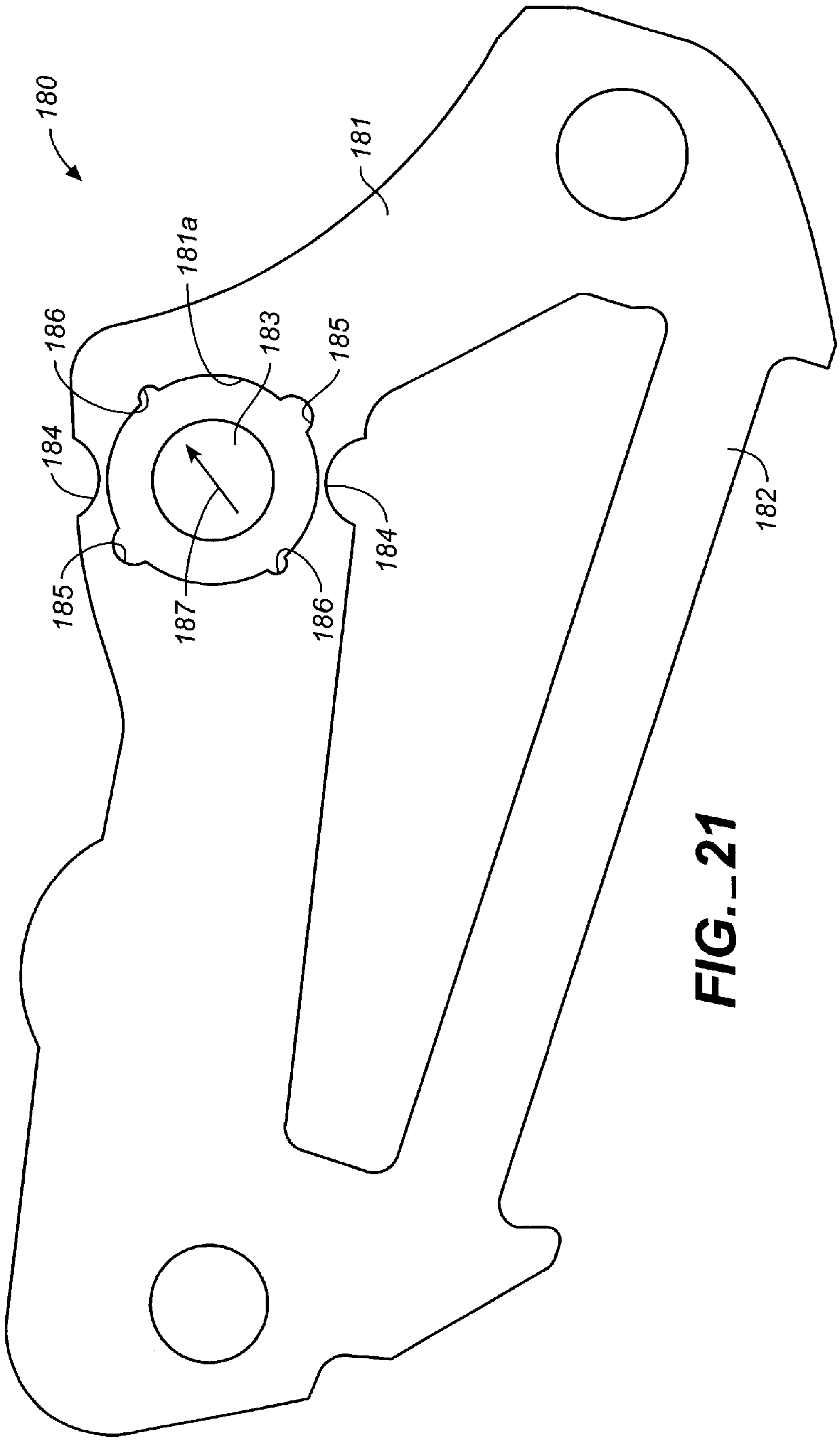
FIG. 21 is a schematic view of a generator serving as an electromagnetic rotation device in a sixth embodiment of the present invention.

The stator used in the generator in the present invention is not limited to those having the forms described in the first and third embodiments, so that there may be used, for example, a stator structure including one stator such as those illustrated in FIGS. 18 and 21, or a stator structure including two stators. The stator structure including two stators may be of the type in which side surfaces of back end portions (core magnetism conducting sections) are in contact with each other, or of the type in which each core magnetism conducting section is placed upon each other at right angles with respect to a direction of contact, or of the type in which back end portions disposed so as to be separated apart are made to conduct electricity through, for example, the yoke 58 shown in FIG. 11.

The sizes (radii, etc.) of the inside notches 37, 51, 71, and 186 that are provided are not limited to those of the respective embodiments. More specifically, the optimal size of each of the inside notches 37, 51, 71, and 186 depends on the magnetic resistance of each magnetic circuit path. For example, in the magnetic circuit used in the fourth embodiment, each cogging torque is substantially a minimum when the radius of each inside notch 51 is 0.1 mm. As the radius becomes smaller than 0.1 mm, the amount by which each cogging torque decreases is reduced, whereas, as the radius becomes greater than 0.1 mm, each cogging torque tends to gradually increase. On the other hand, in the first embodiment, as shown in FIG. 7, each cogging torque is substantially a minimum when the radius of each inside notch 37 is 0.15 to 0.17 mm.

Since the cogging torque of each entire magnetic circuit system depends on a balance between the magnetic resistance in a direction of a corresponding main magnetic path and the magnetic resistance in a direction which is, for example, perpendicular to the corresponding main magnetic path when the inside notches 37, the inside notches 51, the inside notches 71, and the inside notches 186 are provided, the size and the like of each of the inside notches 37, 51, 71, and 186 may be set taking into consideration the condition corresponding thereto.

The stator structure in which stator holes (rotor hole portions) are formed may be an integral structure or a structure including two stators. The form and material are not limited to those in each of the embodiments, so that they may be suitably set when carrying out the invention.

The sizes and materials of the rotors 12 (rotor magnet 12*b*) and 183 are not limited to those in the embodiments.

The mechanical energy source (mechanical energy accumulating device) used to drive each of the generators 30, 120, and 180 is not limited to the mainspring 1*a*, so that, for example, rubber, a spring, a weight, or a fluid such as compressed air may also be used. The mechanical energy source may be suitably provided in accordance with the device to which the present invention is applied. Usable means for inputting mechanical energy to these mechanical energy sources include an automatic winder, an oscillating weight, potential energy, changes in air pressure, wind power, wave power, water power, and differences in temperature.

Usable mechanical energy transmitting means for transmitting mechanical energy from a mechanical energy source such as a mainspring include not only a wheel train (gears) such as those used in the embodiments but also a frictional wheel, a belt (for example, a timing belt) and a pulley, a chain and a sprocket wheel, a rack and a pinion, and a cam. A suitable mechanical energy transmitting means may be selected according to the type of electronic controlling type mechanical timepiece to which the present invention is applied.

The time indicator not only includes a hand but also a disk, an annular indicator or an arcuate indicator.

The electronic controlling type mechanical timepiece in accordance with the present invention may be applied not only to a wristwatch, but also a clock, or other types of timepieces.

The information regarding the formation of inside notches based on the shape coefficient or the information regarding the size of an inside notch may be used in forming an inside notch in a stator of a generator (of, for example, a type in which electrical power is generated with the movement of an oscillating weight) or a stepping motor of other types of electronic timepieces in order to effectively decrease the cogging torque.

INDUSTRIAL APPLICABILITY

As can be understood from the foregoing description, according to the present invention, since adjusting sections for magnetic balancing adjustments between the stator and the rotor are provided, it is possible to reliable reduce the cogging torque of the rotor using a simple structure in order to perform a proper starting operation and to enhance reliability while maintaining the efficiency with which electrical power is generated as a result of obtaining a sufficient number of magnetic flux linkages with the stator.

When inside notches are formed in locations in correspondence with the direction of a magnetic pole when the rotor is statically stable prior to the formation of the inside notches as adjusting sections, the cogging torque of an electronic controlling type mechanical timepiece can be easily decreased.

Accordingly, in the electronic controlling type mechanical timepiece of the present invention, since the cogging torque generated at the rotor of the generator can be reduced without decreasing the number of magnetic flux linkages that greatly affect the electrical power generation capability, the rotor can be properly started and rotated, and the rotational speed of the rotor can be increased, making it possible to generate an electromotive voltage which is larger than that in a conventional rotor. Moreover, since higher efficiency is achieved than has been conventionally possible, the rotor and the like can be made smaller and thinner.

What is claimed is:

1. An electronic controlling type mechanical timepiece, comprising:

a mechanical energy source including a mechanical energy accumulating device;

a generator operably coupled to, and adapted to be driven by, the mechanical energy source, the generator including a rotor, and a stator having an arcuate portion defining a stator hole in which the rotor is disposed, the arcuate portion having an adjusting section formed therein;

a rotation controller operably coupled to the generator to control a period of rotation of the generator; and a time indicator rotatably coupled to the generator;

wherein the adjusting section comprises a metallic piece comprised of magnetic material formed on the arcuate portion and performs a magnetic balancing adjustment between the stator and the rotor in order to reduce cogging torque of the rotor.

2. An electronic controlling type mechanical timepiece according to claim 1, further comprising a mechanical energy transmitting device including a wheel train, wherein the mechanical energy accumulating device is a mainspring, and wherein the mechanical energy accumulated in the mainspring is transmitted to the generator through the wheel train.

3. An electronic controlling type mechanical timepiece, comprising:

a mechanical energy source including a mechanical energy accumulating device;

a generator operably coupled to, and adapted to be driven by, the mechanical energy source, the generator including a rotor, and a stator having an arcuate portion defining a stator hole in which the rotor is disposed, the arcuate portion having an adjusting section formed therein;

a rotation controller operably coupled to the generator to control a period of rotation of the generator; and a time indicator rotatably coupled to the generator;

wherein the adjusting section comprises a first pair of inside notches formed at opposing locations in an inner peripheral surface of the arcuate portion defining the stator hole and a second pair of inside notches formed at opposing locations in the inner peripheral surface of the arcuate portion, and wherein the adjusting section performs a magnetic balancing adjustment between the stator and the rotor in order to reduce cogging torque of the rotor; and wherein the inside notch is formed at a location on the inner peripheral surface of the arcuate portion based on a direction of a magnetic pole of the rotor when the rotor is statically stable without the inside notch being formed.

4. An electronic controlling type mechanical timepiece according to claim 3, wherein each inside notch is formed within a predetermined angular range from the direction of the magnetic pole of the rotor with respect to the center of the rotor is statically stable.

5. An electronic controlling type mechanical timepiece according to claim 4, wherein the predetermined angular range is ±40 degrees.

6. An electronic controlling type mechanical timepiece according to claim 5, wherein the predetermined angular range is ±4 degrees.

7. An electronic controlling type mechanical timepiece according to claim 3, further comprising a mechanical energy transmitting device including a wheel train, wherein the mechanical energy accumulating device is a mainspring, and wherein mechanical energy accumulated in the mainspring is transmitted to the generator through the wheel train.

8. An electronic controlling type mechanical timepiece according to claim 3, wherein the stator has opposing arcuate portions separated by a gap, and wherein the first and second pairs of inside notches are respectively formed in opposing arcuate portions about 90 degrees from the gap.

9. An electronic controlling type mechanical timepiece, comprising:

mechanical energy means for generating and accumulating mechanical energy;

means for supplying electrical energy by generating an induced electromotive force in response to being driven by the mechanical energy means, the electrical energy supplying means including rotor means for rotating in response to being driven by the mechanical energy means, and stator means having arcuate means for defining a stator hole in which the rotor means is disposed, the arcuate means having adjusting means formed therein for performing magnetic balancing adjustment between the rotor means and the stator means in order to reduce cogging torque of the rotor means;

means for controlling a period of rotation of the electrical energy supplying means; and means, rotatably coupled to the electrical energy supplying means, for indicating time;

wherein the adjusting means comprises a first pair of inside notches formed at opposing locations in an inner peripheral surface of the arcuate means defining the stator hole and a second pair of inside notches formed at opposing locations in the inner peripheral surface of the arcuate portion; and wherein the first and second pairs of inside notches are formed on the inner peripheral surface of the arcuate means based on a direction of a magnetic pole of the rotor means when the rotor means is statically stable without the notch means being formed.

10. An electronic controlling type mechanical timepiece according to claim 9, wherein each notch is formed within a predetermined angular range from the direction of the magnetic pole of the rotor means with respect to the center of the rotor means when the rotor means is statically stable.

11. An electronic controlling type mechanical timepiece according to claim 10, wherein the predetermined angular range is ±40 degrees.

12. An electronic controlling type mechanical timepiece according to claim 11, wherein the predetermined angular range is ±4 degrees.

13. An electronic controlling type mechanical timepiece, comprising:

mechanical energy means for generating and accumulating mechanical energy;

means for supplying electrical energy by generating an induced electromotive force in response to being driven by the mechanical energy means, the electrical energy supplying means including rotor means for rotating in response to being driven by the mechanical energy means, and stator means having arcuate means for defining a stator hole in which the rotor means is disposed, the arcuate means having adjusting means formed therein for performing magnetic balancing adjustment between the rotor means and the stator means in order to reduce cogging torque of the rotor means;

means for controlling a period of rotation of the electrical energy supplying means; and means, rotatably coupled to the electrical energy supplying means, for indicating time;

wherein the adjusting means comprises a first pair of inside notches formed at opposing locations in an inner peripheral surface of the arcuate means and a second pair of notch means formed at opposing locations in the inner peripheral surface of the arcuate means, each notch means being formed into a semicircular shape having a radius in a range of about 0.05 mm to about 0.20 mm.

14. A method of forming an electronic controlling type mechanical timepiece, comprising the steps of:

providing a mechanical energy source that includes a mechanical energy accumulating device;

providing a generator operably coupled to, and adapted to be driven by, the mechanical energy source, including providing a rotor, and a stator having an arcuate portion defining a stator hole in which the rotor is disposed;

forming an adjusting section in the arcuate portion;

providing a rotation controller operably coupled to the generator;

wherein the adjusting section performs a magnetic balancing adjustment between the stator and the rotor in order to reduce cogging torque of the rotor; and wherein the forming step comprises forming a first pair of inside notches at opposing locations on an inner peripheral surface of the arcuate portion defining the stator hole and forming a second pair of inside notches at opposing locations on the inner peripheral surface of the arcuate portion based on a direction of a magnetic pole of the rotor when the rotor is statically stable without the inside notch being formed.

15. A method according to claim 14, wherein the forming step comprises forming each inside notch within a predetermined angular range from the direction of the magnetic pole of the rotor with respect to the center of the rotor when the rotor is statically stable.

16. A method according to claim 15, wherein the predetermined angular range is ±40 degrees.

17. A method according to claim 16, wherein the predetermined angular range is ±4 degrees.

18. A method of forming an electronic controlling type mechanical timepiece, comprising the steps of:

providing a mechanical energy source that includes a mechanical energy accumulating device;

providing a generator operably coupled to, and adapted to be driven by, the mechanical energy source, including providing a rotor, and a stator having an arcuate portion defining a stator hole in which the rotor is disposed;

forming an adjusting section in the arcuate portion, wherein the forming step comprises forming a first pair of inside notches at opposing locations in an inner peripheral surface of the arcuate portion and forming a second pair of inside notches at opposing locations in the inner peripheral surface of the arcuate portion, each inside notch being formed into a semicircular shape having a radius in a range of about 0.05 mm to about 0.20 mm;

providing a rotation controller operably coupled to the generator to control a period of rotation of the generator; and providing a time indicator rotatably coupled to the generator;

wherein the adjusting section performs a magnetic balancing adjustment between the stator and the rotor in order to reduce cogging torque of the rotor.

19. An electronic controlling type mechanical timepiece, comprising:

a mechanical energy source including a mechanical energy accumulating device;

a generator operably coupled to, and adapted to be driven by, the mechanical energy source, the generator including a rotor, and a stator having an arcuate portion defining a stator hole in which the rotor is disposed, the stator hole having a guide member formed therein to guide the stator, the guide member including a metallic piece;

a rotation controller operably coupled to the generator to control a period of rotation of the generator; and a time indicator rotatably coupled to the generator;

wherein the guide member and the metallic piece cooperate to perform a magnetic balancing adjustment between the stator and the rotor in order to reduce cogging torque of the rotor.

20. An electronic controlling type mechanical timepiece, comprising:

a mechanical energy source including a mechanical energy accumulating device;

a generator operably coupled to, and adapted to be driven by, the mechanical energy source, the generator including a rotor, and a stator having an arcuate portion defining a stator hole in which the rotor is disposed, the arcuate portion having an adjusting section formed therein;

a rotation controller operably coupled to the generator to control a period of rotation of the generator; and a time indicator rotatably coupled to the generator;

wherein the adjusting section comprises a first pair of inside notches formed at opposing locations in an inner peripheral surface of the arcuate portion and a second pair of inside notches formed at opposing locations in the inner peripheral surface of the arcuate portion, the adjusting section performing a magnetic balancing adjustment between the stator and the rotor in order to reduce cogging torque of the rotor; and wherein the shape of the coefficient K of each inside notch is in a range of about 0.0005 $mm^2$ to about 0.125 $mm^2$.

21. An electronic controlling type mechanical timepiece, comprising:

a mechanical energy source including a mechanical energy accumulating device;

a generator operably coupled to, and adapted to be driven by, the mechanical energy source, the generator including a rotor, and a stator having an arcuate portion defining a stator hole in which the rotor is disposed, the arcuate portion having an adjusting section formed therein;

a rotation controller operably coupled to the generator to control a period of rotation of the generator; and a time indicator rotatably coupled to the generator;

wherein the adjusting section comprises a first pair of inside notches formed at opposing locations in an inner peripheral surface of the arcuate portion and a second pair of inside notches formed at opposing locations in the inner peripheral surface of the arcuate portion, the adjusting section performing a magnetic balancing adjustment between the stator and the rotor in order to reduce cogging torque of the rotor; and wherein the inside notch is formed into a semicircular shape having a radius in a range of about 0.05 mm to about 0.20 mm.

* * * * *

UNITED STATES PATENT AND TRADEMARK OFFICE

CERTIFICATE OF CORRECTION

PATENT NO. : 6,633,511 B1
DATED : October 14, 2003
INVENTOR(S) : Masatoshi Moteki et al.

It is certified that error appears in the above-identified patent and that said Letters Patent is hereby corrected as shown below:

Column 27,
Line 63, after "generator", insert -- to control a period of rotation of the generator; and Providing a time indicator rotatably coupled to the generator --

Signed and Sealed this

Ninth Day of March, 2004

JON W. DUDAS
*Acting Director of the United States Patent and Trademark Office*